US011240664B2

(12) United States Patent
Lee et al.

(10) Patent No.: US 11,240,664 B2
(45) Date of Patent: Feb. 1, 2022

(54) METHOD AND ELECTRONIC DEVICE FOR CONTROLLING DATA COMMUNICATION

(71) Applicant: Samsung Electronics Co., Ltd., Gyeonggi-do (KR)

(72) Inventors: Junghun Lee, Gyeonggi-do (KR); Chounjong Nam, Gyeonggi-do (KR); Doosuk Kang, Gyeonggi-do (KR); Sunkey Lee, Gyeonggi-do (KR); Bokun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/957,445

(22) PCT Filed: Jan. 14, 2019

(86) PCT No.: PCT/KR2019/000519
§ 371 (c)(1),
(2) Date: Jun. 24, 2020

(87) PCT Pub. No.: WO2019/143081
PCT Pub. Date: Jul. 25, 2019

(65) Prior Publication Data
US 2021/0076211 A1 Mar. 11, 2021

(30) Foreign Application Priority Data

Jan. 19, 2018 (KR) .......................... 10-2018-0007349

(51) Int. Cl.
*H04W 12/06* (2021.01)
(52) U.S. Cl.
CPC .................................. *H04W 12/06* (2013.01)

(58) Field of Classification Search
CPC .... H04W 12/06; G06F 3/041; H04L 63/0428; H04L 63/08; H04L 63/18; H04L 67/06; H04L 29/06; H04L 29/08
See application file for complete search history.

(56) References Cited

U.S. PATENT DOCUMENTS 10,164,989 B2 * 12/2018 Paugh ..................... G06N 20/00
10,412,079 B2 *  9/2019 Dixit ........................ G06F 8/62
(Continued)

FOREIGN PATENT DOCUMENTS

KR    10-2006-0105693 A    10/2006
KR    10-2014-0044923 A     4/2014
(Continued)

*Primary Examiner* — Khawar Iqbal
(74) *Attorney, Agent, or Firm* — Cha & Reiter, LLC

(57) ABSTRACT

The electronic device according to various embodiments comprises: a housing structure; a user interface located in the housing structure; a network interface that can be connected by wire or wirelessly; a wireless communication circuit configured to communicate with an external device by using frequencies between 10 GHz and 100 GHz; a processor located in the housing structure and operatively connected to the user interface, the network interface, and the wireless communication circuit; and a memory located in the housing structure and operatively connected to the processor. When the memory is running, the processor may: establish a first communication channel with a first external device by means of the wireless communication circuit; receive authentication information from the first external device by means of the first communication channel; receive data from the first external device by means of the first communication channel, while or after receiving the authentication information; store the received data in the memory at least temporarily; establish a second communication channel with a second external device by means of the network interface, by using the authentication information;
(Continued)

and store commands for transmitting the stored data to the second external device by means of the second communication channel. Other embodiments are possible.

14 Claims, 20 Drawing Sheets

(56) References Cited

U.S. PATENT DOCUMENTS

| | | | |
|---|---|---|---|
| 10,660,007 B2* | 5/2020 | Giloh | H04W 84/005 |
| 10,791,446 B2* | 9/2020 | Reynders | G06Q 20/145 |
| 2005/0102529 A1 | 5/2005 | Buddhikot et al. | |
| 2007/0022469 A1 | 1/2007 | Cooper et al. | |
| 2009/0010233 A1 | 1/2009 | Pratt, Jr. et al. | |
| 2013/0172011 A1 | 7/2013 | Ortiz | |
| 2013/0275615 A1 | 10/2013 | Oyman | |
| 2014/0059378 A1* | 2/2014 | Ishii | G06F 11/1469 714/15 |
| 2014/0101238 A1 | 4/2014 | Soon-Shiong | |
| 2014/0172699 A1 | 6/2014 | Crawford et al. | |
| 2016/0027399 A1 | 1/2016 | Wilde et al. | |
| 2016/0065572 A1* | 3/2016 | Kim | H04L 63/0861 726/7 |
| 2017/0265127 A1 | 9/2017 | Kim et al. | |
| 2017/0359338 A1* | 12/2017 | Tschofenig | G06F 21/34 |
| 2018/0109947 A1* | 4/2018 | Kim | G06F 21/34 |
| 2018/0145970 A1* | 5/2018 | Agrawal | H04L 9/088 |
| 2018/0192282 A1* | 7/2018 | Dowlatkhah | H04W 8/205 |
| 2018/0212960 A1* | 7/2018 | Sandeep | H04L 63/0428 |
| 2019/0392417 A1* | 12/2019 | Li | G06Q 20/3221 |
| 2020/0213935 A1* | 7/2020 | Lin | H04W 28/0226 |
| 2020/0322486 A1* | 10/2020 | Friedrich | H04W 4/24 |

FOREIGN PATENT DOCUMENTS

| | | |
|---|---|---|
| KR | 10-2014-0124175 A | 10/2014 |
| KR | 10-2015-0067325 A | 6/2015 |
| KR | 10-2015-0107806 A | 9/2015 |
| KR | 10-2016-0030718 A | 3/2016 |

* cited by examiner

METHOD AND ELECTRONIC DEVICE FOR CONTROLLING DATA COMMUNICATION

CROSS-REFERENCE TO RELATED APPLICATION(S)

This application is a National Phase Entry of PCT international Application No. PCT/KR2019/000519, which was filed on Jan. 14, 2019, and claims priority to Korean Patent Application No. 10-2018-0007349 filed on Jan. 19, 2018 in the Korean Intellectual Property Office, the contents of which are incorporated herein by reference.

BACKGROUND

1. Field

Various embodiments relate to a method and electronic device to control a data communication.

2. Description of the Related Art

With development of wireless communication technologies, a data transmission speed has been improved. In addition, various electronic devices using wireless communication technologies have been developed.

Recently, a standard for an ultra-high speed wireless transmission technology using a millimeter wave has been developed. The millimeter wave system may generally mean a system using an ultra-high frequency of 30 to 300 GHz. For example, a WiGig communication, which is an IEEE 802.11ad standard technology, is a standard technology designed to achieve a multi-Gbps wireless transmission speed by securing a wider bandwidth from a new unlicensed frequency band (e.g., 60 GHz) to overcome a narrow bandwidth limit of a frequency band (e.g., 2.4-5 GHz) used by a Wi-Fi communication. It is a standard technology designed to achieve a multi-Gbps wireless transmission speed by securing a wider bandwidth (e.g., 60 GHz). The IEEE 802.11ad standard technology may use up to four channels based on a 2160 MHz bandwidth per channel.

SUMMARY

In a wireless communication environment, an electronic device may have a limitation to data transmission according to a used communication scheme. For example, a Wi-Fi communication has a disadvantage that a communication speed of the electronic device may be decreased due to interference, and that the greater the number of other electronic devices which access an access point (AP) accessed by the electronic device for use of the Wi-Fi communication becomes, the worse the interference becomes. For example, a WiGig communication enables a stable high-speed communication of the electronic device as compared to the Wi-Fi communication, but has a short coverage and poor permeability due to large attenuation of a signal.

According to various embodiments, a method and electronic device to control a data communication capable of efficiently transmitting and receiving large amount of data may be provided.

According to various embodiments, an electronic device may receive data from a first external electronic device using a first communication, and transmit (or back up), to a second external electronic device (e.g., a cloud server), the data received from the first external electronic device using a second communication.

According to various embodiments, an electronic device is provided, and the electronic device comprises a housing structure; a user interface located in the housing structure; a network interface which is wiredly or wirelessly connectable; a wireless communication circuit configured to communicate with an external device using a frequency between 10 GHz and 100 GHz; a processor which is located in the housing structure, and operatively connected with the user interface, the network interface, and the wireless communication circuit; and a memory which is located in the housing structure, and operatively connected with the processor, wherein the memory may store instructions that cause, when executed, the processor to: establish a first communication channel with a first external device using the wireless communication circuit; receive authentication information from the first external device using the first communication channel; receive data from the first external device using the first communication channel while or after receiving the authentication information; store the received data at least temporarily in the memory; establish a second communication channel with a second external device, using the authentication information, via the network interface; and transmit the stored data to the second external device using the second communication channel.

According to various embodiments, a method to control a data communication of an electronic device is provided, and the method may comprise establishing a first communication channel with a first external device using a wireless communication circuit which is configured to communicate with an external device using a frequency between 10 GHz and 100 GHz; receiving authentication information from the first external device using the first communication channel; receiving data from the first external device using the first communication channel while or after receiving the authentication information; storing the received data at least temporarily in a memory of the electronic device; establishing a second communication channel with a second external device, using the authentication information, via a network interface of the electronic device; and transmitting the stored data to the second external device using the second communication channel.

According to various embodiments, a machine-readable storage medium having recorded thereon a program to execute a method to control a data communication of an electronic device is provided, and the method may comprise establishing a first communication channel with a first external device using a wireless communication circuit which is configured to communicate with an external device using a frequency between 10 GHz and 100 GHz; receiving authentication information from the first external device using the first communication channel; receiving data from the first external device using the first communication channel while or after receiving the authentication information; storing the received data at least temporarily in a memory of the electronic device; establishing a second communication channel with a second external device, using the authentication information, via a network interface of the electronic device; and transmitting the stored data to the second external device using the second communication channel.

A method and electronic device to control a data communication according to various embodiments may transmit (back up) a large amount of files which are received from an external electronic device using a communication capable of high-speed transmission (e.g., WiGig) to an external cloud server, and/or the like using a communication such as Ethernet, Wi-Fi, and/or the like.

An electronic device according to various embodiments may access a cloud server, and/or the like based on an account of an external electronic device and transmit data.

DETAILED DESCRIPTION

Figure 1:
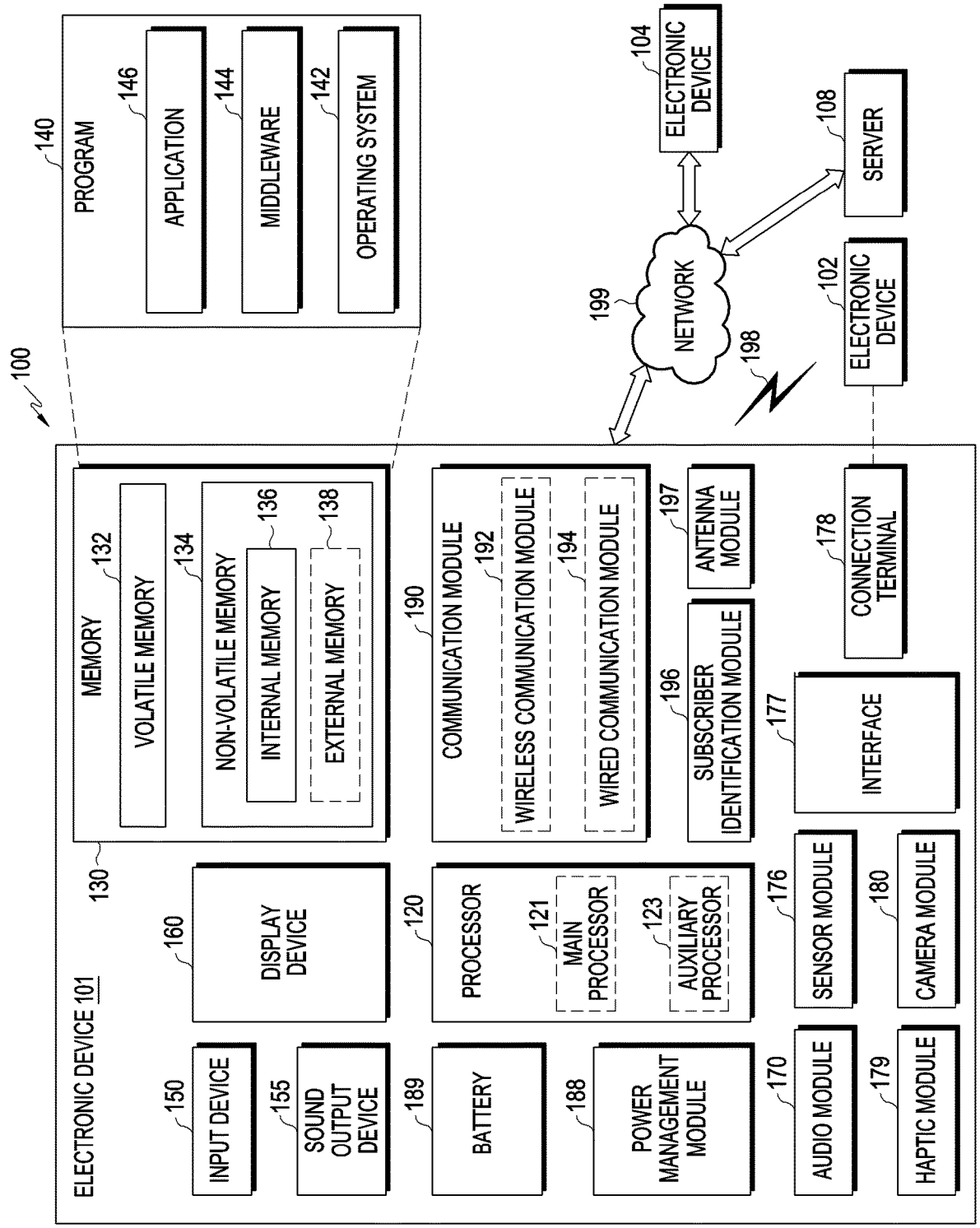
FIG. 1 illustrates a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). According to an embodiment, the communication module 190 may include a wireless communication circuit configured to communicate with an external device using a frequency between 10 GHz and 100 GHz. For example, the frequency may be 60 GHz. For example, the wireless communication circuit may be configured to support a WiGig specification. These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
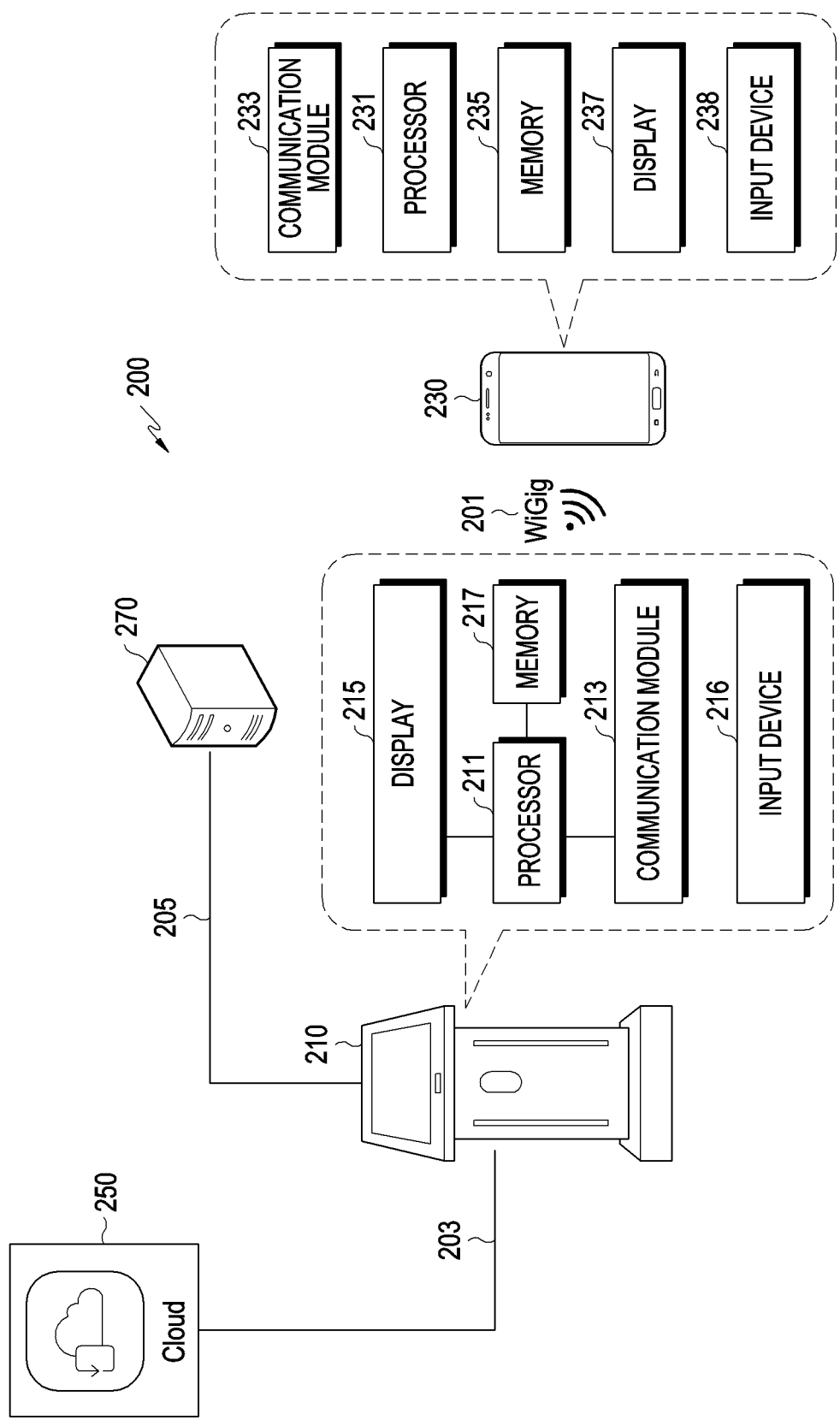
FIG. 2 is a diagram illustrating a network structure according to various embodiments.

FIG. 2 is a diagram illustrating a network 200 structure according to various embodiments.

Referring to FIG. 2, an electronic device (210) (e.g., an electronic device 101 of FIG. 1) may transmit and receive data (or upload or download) with a first external electronic device 230 using a first communication channel 201. For example, the electronic device 210 may upload data to a second external electronic device 250 using a second communication channel 203. For example, the electronic device 210 may perform authentication for client devices (e.g., the first external electronic device 230) with a third external electronic device 270.

According to one embodiment, the electronic device 210 may serve as a storage medium and provide a user with a specific service according to an installed purpose (designated operation).

According to an embodiment, the electronic device 210 may be an electronic device 101 (e.g., a kiosk) of FIG. 1 which may be connected through a short-range communication.

According to an embodiment, the electronic device 210 may include at least part of components of the electronic device 101 of FIG. 1. For example, the electronic device 210 may include a processor 211 (e.g., a processor 120), a communication module 213 (e.g., a communication module 190), a display 215 (a display device 160), an input device 216 (e.g., an input device 150), and a memory 217 (e.g., a memory 130).

The communication module 213 may include one or more wireless communication circuits (e.g., a wireless communication module 192) and wired communication circuits (e.g., a wired communication module 194) configured to communicate on one or more designated frequency bands. For example, the one or more wireless communication circuits may include a circuit configured to communicate with an external device (e.g., an electronic device 102 of FIG. 1) using a frequency between 10 GHz and 100 GHz. For example, the wireless communication circuit may include a circuit configured to perform a WiGig communication of a 60 GHz frequency band. For example, the one or more wireless communication circuits may include a circuit configured to perform an Ethernet communication and/or a Wi-Fi communication of 2.4-5 GHz frequency band.

The memory 217 may include various storage devices such as a hard disk drive (HDD) storage device, an optical disk drive (ODD) storage device, a solid state drive (SDD) storage device, a solid state hybrid drive (SSHD) storage device, and/or a memory card, etc.

The processor 211 may include one or more of a central processing unit (CPU), an application processor (AP), or a communication processor (CP).

According to an embodiment, the processor 211 may control a communication with the first external electronic device 230 using the communication module 213. For example, the processor 215 may establish the first communication channel 201 (also referred to as a first communication connection 201) with the first external electronic device 230 using the communication module 213. For example, the processor 215 may control transmission and reception (download or upload) of data with the first external electronic device 230 using the first communication channel 201 with the first external electronic device 230.

According to an embodiment, the processor 211 may control a communication with the second external electronic device 250 using the communication module 213. For example, the processor 211 may establish the second communication channel 203 (also referred to as a second communication connection 203) with the second external electronic device 250 using the communication module 213. For example, the processor 211 may control transmission (upload) of data stored in the memory 217 to the second external electronic device 250 using the second communication channel 203 with the second external electronic device 250. For example, the processor 211 may control sequential transmission (or upload) of the data stored in the memory 217 to the second external electronic device 250.

According to an embodiment, the second external electronic device 250 may be a server (e.g., a cloud server) (e.g., a server 108). For example, the data stored in the memory 217 may be data to be stored in a cloud server of a user account of the first external electronic device 230, and the processor 211 may control to upload the data to the second external electronic device 250 which is a cloud server of the user account of the first external electronic device 230 using the second communication channel 203 with the second external electronic device 250.

According to an embodiment, the processor 211 may control a communication with the third external electronic device 270 using the communication module 213. For example, the processor 211 may establish a third communication channel 205 (e.g., also referred to as a third communication 205) with the third external electronic device 270 using the communication module 213. For example, the processor 211 may control a communication with the third external electronic device 270 using the third communication channel 205 with the third external electronic device 270.

According to an embodiment, the third external electronic device 270 may be a server (e.g., an authentication server). For example, the third external electronic device 270 may perform an authentication operation for client devices of the electronic device 210. For example, the third external electronic device 270 may receive, from the electronic device 210, information related to authentication (also referred to as authentication information) of the first external electronic device 230, and perform an authentication operation of the first external electronic device 230 using the received information related to authentication. For example, the information related to authentication of the first external electronic device 230 may include at least part of a type of the first external electronic device 230 connected to the electronic device 210, device information (e.g., MAC address information, etc.) of the first external electronic device 230, communication provider information of the first external electronic device 230, account information of the first external electronic device 230, service information being used by the first external electronic device 230, service information for data backup of the first external electronic device 230 (e.g., cloud server information (e.g., URL of a cloud server, an ID, a password, etc.) being used by a user of the first external electronic device 230), and/or information of the second external electronic device 250 to which data of the first external electronic device 230 will be backed up, etc.

According to an embodiment, the first external electronic device 230 may be an electronic device 104 of FIG. 1.

According to an embodiment, the first external electronic device 230 may include a processor 231 (e.g., the processor 120), a communication module 233 (e.g., the communication module 190), a memory 235 (e.g., the memory 130), a display 237 (e.g., the display device 160), and an input device 238 (e.g., the input device 150).

The communication module 233 may include, for example, a wireless communication circuit (e.g., the wireless communication module 192) and a wired communication circuit (e.g., the wired communication module 194) configured to communicate on one or more designated frequency bands. For example, the wireless communication circuit may be a circuit configured to communicate with an external device (e.g., the electronic device 210) using a frequency between 10 GHz and 100 GHz. For example, the wireless communication circuit may include a circuit configured to perform a WiGig communication of a 60 GHz frequency band.

The memory 235 may store various data used by at least one component (e.g., the processor 231, the communication module 233, and the display 237) of the first external electronic device 230.

The processor 231 may control a communication with the electronic device 210 using the communication module 233. For example, the processor 231 may control transmission and reception (upload or download) of data with the electronic device 210 using the first communication channel 201 which is established through the communication module 233.

In the described embodiment of FIG. 2, the second external electronic device 450 and the third external electronic device 470 are described as operating separately, but the second external electronic device 450 may be configured to perform an authentication operation for client devices of the electronic device 210 of the external electronic device 470 according to another embodiment.

Figure 3:
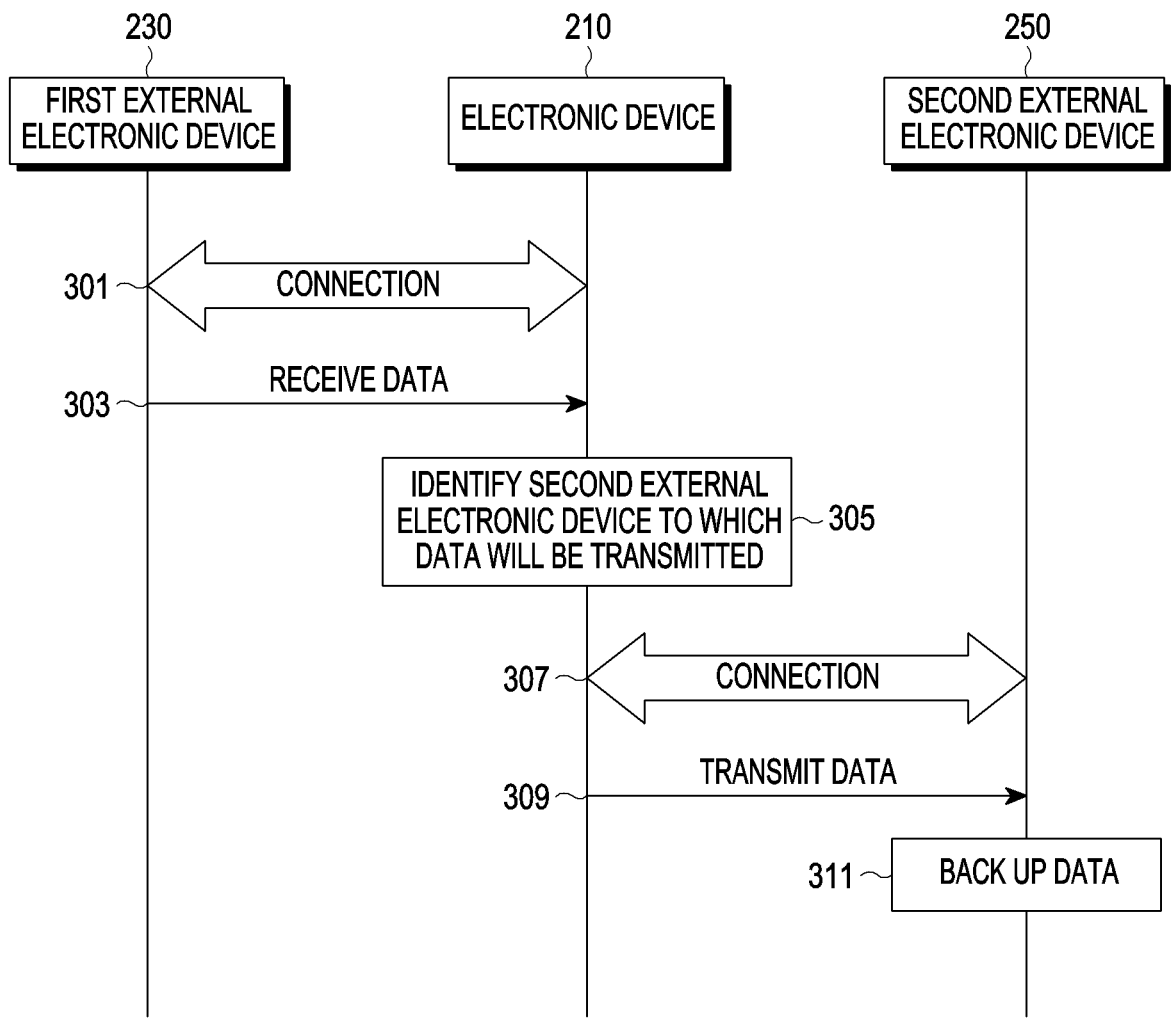
FIG. 3 is a flowchart illustrating an operation to control a data communication of an electronic device according to various embodiments.
Figure 4:
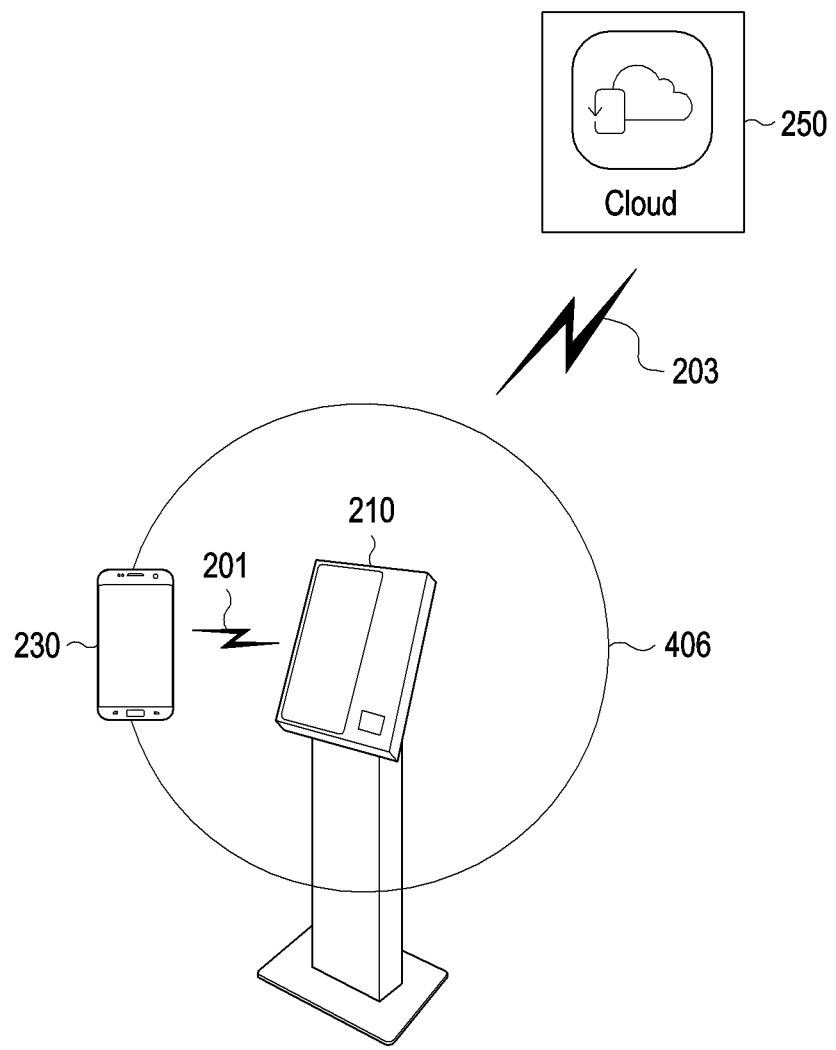
FIG. 4 is a diagram for describing an operation to control a data communication of an electronic device according to various embodiments.

FIG. 3 is a flow chart of an operation to control a data communication of an electronic device according to various embodiments, and FIG. 4 is a diagram for describing an operation to control a data communication of an electronic device according to various embodiments.

Referring to FIGS. 3 and 4, an electronic device 210 may transmit, to a second external electronic device 250, data received from a first external electronic device 230, and the second external electronic device 250 may back up (store) the data.

In operation 301, a communication channel may be connected between the electronic device 210 and the first external electronic device 230.

According to an embodiment, as shown in FIG. 4, the first external electronic device 230 may be located within a coverage area 406 of a first communication where the first external electronic device 230 may perform a first communication with the electronic device 210, and the electronic device 210 may establish a first communication channel 201 (also referred to as a first communication connection) with the first external electronic device 230 using a communication module 213.

According to an embodiment, if the first external electronic device 230 is located within the coverage area 406 where the first external electronic device 230 may perform the first communication in close proximity to the electronic device 210, the electronic device 210 may automatically establish the first communication channel 201 with the first external electronic device 230 using the communication module 213 based on a designated condition. For example, if the first external electronic device 230 is located within the coverage area 406 of the first communication while a first communication function is activated, and there is a history in which the first external electronic device 230 used the electronic device 210 (record in which the first external electronic device 230 and the electronic device 210 were previously connected), the electronic device 210 may automatically establish the first communication channel 201 with the first external electronic device 230.

According to another embodiment, the first external electronic device 230 may establish the first communication channel 201 with the electronic device 210 using a communication module 233 based on an instruction received through an input device 238. For example, if the first external electronic device 230 is located within the coverage area 406 of the first communication while the first communication function of the first external electronic device 230 is activated, a message asking whether to connect a communication with the electronic device 210 may be displayed on a display 237 of the first external electronic device 230. For example, the first external electronic device 230 may establish the first communication channel 201 with the electronic device 210 based on a user input for the message through the input device 238.

According to another embodiment, the electronic device 210 may establish the first communication channel 201 with the first external electronic device 230 using the communication module 213 based on an instruction received through an input device 216.

According to one embodiment, the communication module 213 may include a circuit configured to perform a communication of a 60 GHz frequency band, and the electronic device 210 may establish the first communication channel 201 with an external electronic device, e.g., the first external electronic device 230 using the circuit configured to perform the communication of the 60 GHz frequency band.

For example, a user using the first external electronic device 230 moves the first external electronic device 230 around the electronic device 210 thereby the first external electronic device 230 is located within the coverage area 406 where the first external electronic device 230 may perform the communication of the 60 GHz frequency band with the electronic device 210, a communication function of the 60 GHz frequency band of the first external electronic device 230 may be activated, and the first communication channel 201 may be established between the first external electronic device 230 and the electronic device 210 according to the activation of the communication function of the 60 GHz frequency band of the first external electronic device 230. For example, when the electronic device 210 broadcasts (advertises) an information element indicating that the electronic device 210 supports a communication service of the 60 GHz frequency band through a beacon or a probe response message, the first external electronic device 230 may receive the message. For example, when receiving the message, the first external electronic device 230 may interpret an information element (IE) included in the received message, and perform notification to activate the communication of the 60 GHz frequency band based on a user input for the notification so that the communication function of the 60 GHz frequency band may be automatically activated or the first external electronic device 230 may activate the communication function of the 60 GHz frequency band. As another example, when receiving the message, the first external electronic device 230 may interpret an IE included in the received message, and perform notification based on a designated condition (if the designated condition is satisfied) so that the communication function of the 60 GHz frequency band may be activated or the first external electronic device 230 may activate the communication function of the 60 GHz frequency band. For example, the designated condition may include a case that data is stored in a size greater than or equal to a size of a storage area designated in the first external electronic device 230, a case that there is a history in which the first external electronic device 230 used the electronic device 210, and/or a case that the first external electronic device 230 is in a designated location (a designated location on a GPS location), etc.

According to an embodiment, the first communication channel 201 using a circuit configured to allow the electronic device 210 and the first external electronic device 230 to perform a communication of the 60 GHz frequency band may be established through a short-range communication. For example, the electronic device 210 and the first external electronic device 230 may include a near field communication (NFC) communication module, and the electronic device 210 and the first external electronic device 230 may activate the communication function of the 60 GHz frequency band based on an NFC communication.

In operation 303, the electronic device 210 may receive data from the first external electronic device 230.

Referring to FIG. 4, the first external electronic device 230 may transmit data to the electronic device 210 using the first communication channel 201, and the electronic device 210 may receive the data transmitted by the first external electronic device 230. For example, the first external electronic device 230 may transmit data to be backed up to the electronic device 210.

In operation 305, the electronic device 210 may identify a second external electronic device 250 to which the data received from the first external electronic device 230 will be transmitted.

Referring to FIG. 4, the electronic device 210 uses information related to authentication of the first external electronic device 230 to identify the second external electronic device 250 to which the data received from the first external electronic device 230 will be transmitted.

According to an embodiment, the data received from the first external electronic device 230 may include at least part of information related to authentication (also referred to as authentication information) of the first external electronic device 230. According to another embodiment, the electronic device 210 may receive, from the first external electronic device 230, the information related to authentication before, during, or after reception of the data. According to another embodiment, the information related to authentication of the first external electronic device 230 may be stored in the electronic device 210. According to still another embodiment, the information related to authentication of the first external electronic device 230 may be input from a user through an input device 216 of the electronic device 210.

According to an embodiment, the information related to authentication may include at least part of the type of the first external electronic device 230 connected to the electronic device 210, the device information (e.g., the MAC address information, etc.) of the first external electronic device 230, the communication provider information of the first external electronic device 230, the account information of the first external electronic device 230, the service information being used by the first external electronic device 230, the service information for data backup of the first external electronic device 230 (e.g., the cloud server information (e.g., the URL of the cloud server, the ID, the password, etc.) being used by the user of the first external electronic device 230), and/or the information of the second external electronic device 250 to which the data of the first external electronic device 230 will be backed up, etc.

According to an embodiment, if the information related to authentication of the first external electronic device 230 is stored in the electronic device 210, the electronic device 210 may identify the second external electronic device 250 to which the data received from the first external electronic device 230 will be transmitted using the stored information related to authentication of the first external electronic device 230 upon identifying the first external electronic device 230. For example, if the information related to authentication of the first external electronic device 230 is stored in the electronic device 210, the electronic device 210 may identify the second external electronic device 250 to which data received from the first external electronic device 230 will be transmitted using the stored information related to authentication of the first external electronic device 230 upon receiving the data from the first external electronic device 230.

In operation 307, a communication channel may be connected between the electronic device 210 and the second external electronic device 250.

Referring to FIG. 4, the electronic device 210 may establish a second communication channel 203 with the second external electronic device 250 (also referred to as a second communication connection) using the communication module 213.

In operation 309, the electronic device 210 may transmit data received from the first external electronic device 230 to the second external electronic device 250.

Referring to FIG. 4, the electronic device 210 may transmit at least part of data received from the first external electronic device 230 to the second external electronic device 250 using the second communication channel 203.

In operation 311, the second external electronic device 250 may back up (store) the data received from the electronic device 210.

Referring to FIG. 4, the second external electronic device 250 may receive and back up (store) data transmitted by the electronic device 210 using the second communication channel 203. For example, the second external electronic device 250 may store the data received from the electronic device 210 based on information of the first external electronic device 230.

Figure 5:
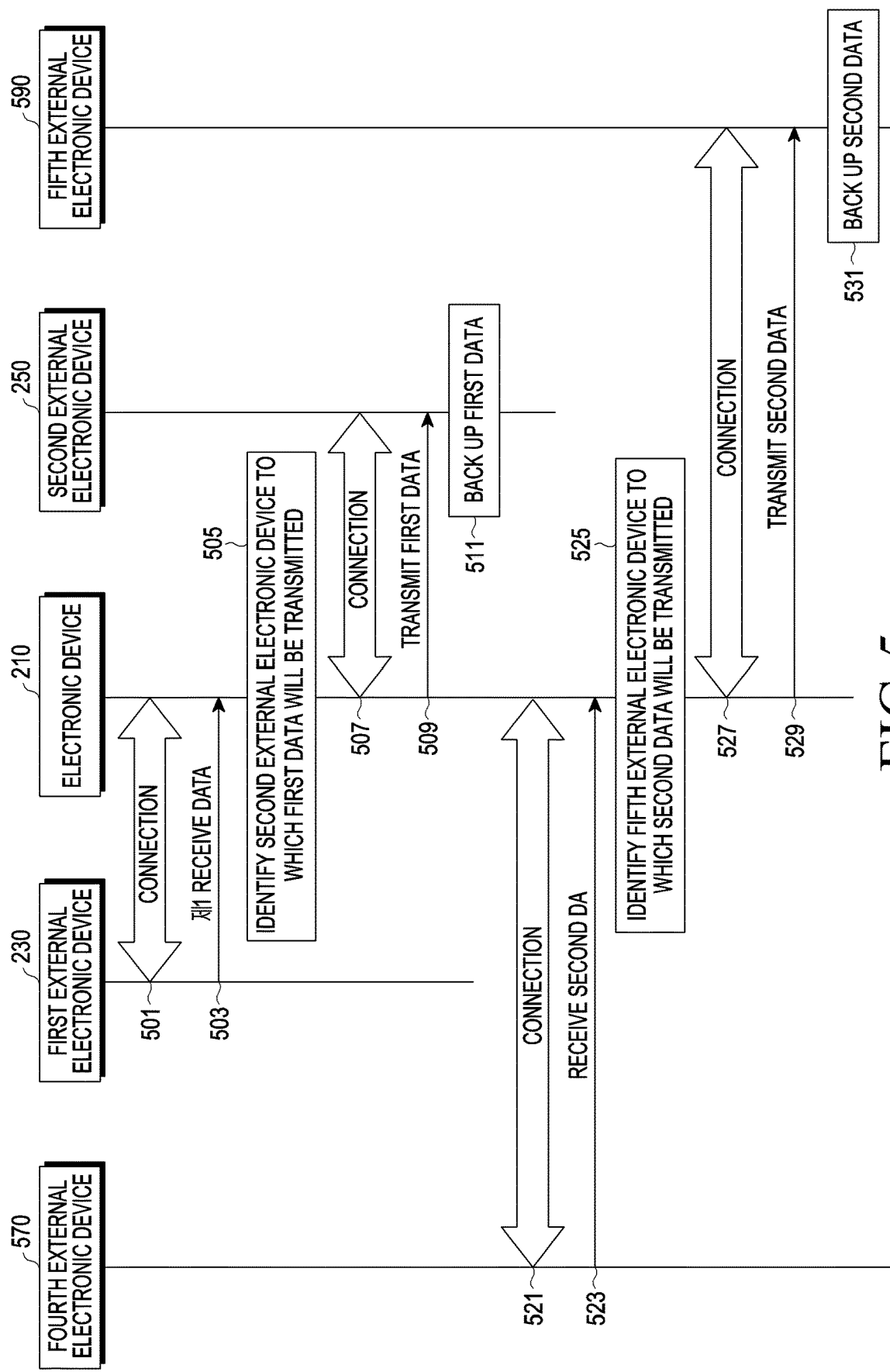
FIG. 5 is a flowchart illustrating an operation to control a data communication of an electronic device according to various embodiments.
Figure 6:
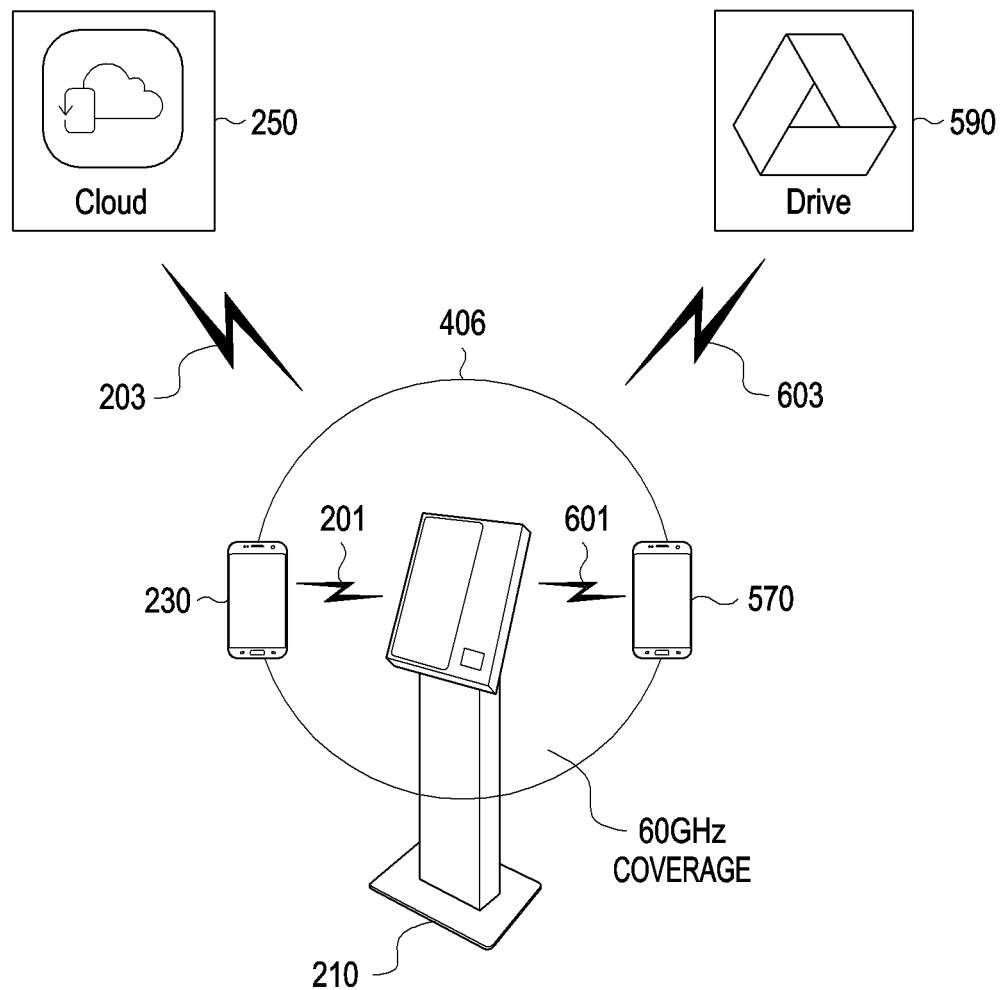
FIG. 6 is a diagram for describing an operation to control a data communication of an electronic device according to various embodiments.

FIG. 5 is a flowchart illustrating an operation to control a data communication of an electronic device 210 according to various embodiments, and FIG. 6 is a diagram for describing an operation to control a data communication of an electronic device 210 according to various embodiments.

Referring to FIGS. 5 and 6, the electronic device 210 may receive, from a first external electronic device 230 which uses a first cloud service and a fourth external electronic device 570 which uses a second cloud service, first data and second data using a first communication to store (back up) the first data and the second data to a second external electronic device 250 which provides the first cloud service and a fifth external electronic device 590 which provides the second cloud service using a second communication.

In operation 501, the electronic device 210 and the first external electronic device 230 may connect a communication channel.

Referring to FIG. 6, the first external electronic device 230 may be located within a coverage area 406 of a first communication where the first external electronic device 230 may perform the first communication with the electronic device 210, and the electronic device 210 may establish a first communication channel 201 (also referred to as a first communication connection) with the first external electronic device 230 using a communication module 213.

In operation 503, the electronic device 210 may receive first data from the first external electronic device 230.

Referring to FIG. 6, the first external electronic device 230 may transmit the first data to the electronic device 210 using the first communication channel 201, and the electronic device 210 may receive the first data transmitted by the first external electronic device 230.

In operation 505, the electronic device 210 may identify the second external electronic device 250 to which the first data received from the first external electronic device 230 will be transmitted.

Referring to FIG. 6, the electronic device 210 may identify the second external electronic device 250 to which data received from the first external electronic device 230 will be transmitted using information related to authentication of the first external electronic device 230.

According to an embodiment, the data received from the first external electronic device 230 may include at least part of the information related to authentication (also referred to as authentication information) of the first external electronic device 230. According to another embodiment, the electronic device 210 may receive the information related to authentication of the first external electronic device 230 before, during, or after reception of the data. According to another embodiment, the information related to authentication of the first external electronic device 230 may be stored in the electronic device 210. According to still another embodiment, the information related to authentication of the first external electronic device 230 may be input from a user through an input device 216 of the electronic device 210.

According to an embodiment, the information related to authentication may include at least part of a type of the first external electronic device 230 connected to the electronic device 210, device information (e.g., MAC address information, etc.) of the first external electronic device 230, communication provider information of the first external electronic device 230, account information of the first external electronic device 230, service information being used by the first external electronic device 230, service information for data backup of the first external electronic device 230 (e.g., cloud server information (e.g., URL of a cloud server, an ID, a password, etc.) being used by a user of the first external electronic device 230), and/or information of the second external electronic device 250 to which the data of the first external electronic device 230 will be backed up, etc.

In operation 507, the electronic device 210 and the second external electronic device 250 may be connected.

Referring to FIG. 6, the electronic device 210 may establish a second communication channel 203 (also referred to as a second communication connection) with the second external electronic device 250 using the communication module 213. For example, the electronic device 210 may establish the second communication channel 203 with the second external electronic device 250 using the identified information of the second external electronic device 250.

In operation 509, the electronic device 210 may transmit at least part of the first data to the second external electronic device 250.

Referring to FIG. 6, the electronic device 210 may transmit at least part of the first data to the second external electronic device 250 using the second communication channel 203.

In operation 511, the second external electronic device 250 may back up (store) the first data.

Referring to FIG. 6, the second external electronic device 250 may receive and back up (store) the first data transmitted by the electronic device 210 using the second communication channel 203.

In operation 521, the electronic device 210 and the fourth external electronic device 570 may connect a communication channel.

Referring to FIG. 6, the fourth external electronic device 570 may be located within a coverage area 406 of the first communication where the fourth external electronic device 570 may perform the first communication with the electronic device 210, and the electronic device 210 may establish a fourth communication channel 601 with the fourth external electronic device 570 using a communication module 213.

In operation 523, the electronic device 210 may receive second data from the fourth external electronic device 570.

Referring to FIG. 6, the fourth external electronic device 570 may transmit the second data to the electronic device 210 using the fourth communication channel 601, and the electronic device 210 may receive the second data transmitted by the fourth external electronic device 570.

In operation 525, the electronic device 210 may identify the fifth external electronic device 590 to which the second data will be transmitted.

Referring to FIG. 6, the electronic device 210 may identify the fifth external electronic device 590 to which data received from the fourth external electronic device 230 will be transmitted using information related to authentication of the fourth external electronic device 570.

According to an embodiment, the data received from the fourth external electronic device 570 may include at least part of the information related to authentication of the fourth external electronic device 570. According to another embodiment, the electronic device 210 may receive the information related to authentication of the fourth external electronic device 570 before, during, or after reception of the data. According to another embodiment, the information related to authentication of the fourth external electronic device 570 may be stored in the electronic device 210. According to still another embodiment, the information related to authentication of the fourth external electronic device 570 may be input through the input device 216 of the electronic device 210.

According to an embodiment, the information related to authentication may include at least part of a type of the fourth external electronic device 570 connected to the electronic device 210, device information (e.g., MAC address information, etc.) of the fourth external electronic device 570, communication provider information of the fourth external electronic device 570, account information of the fourth external electronic device 570, service information being used by the fourth external electronic device 570, service information for data backup of the fourth external electronic device 570 (e.g., cloud server information (e.g., URL of a cloud server, an ID, a password, etc.) being used by a user of the fourth external electronic device 570), and/or information of the fifth external electronic device 590 to which the data of the fourth external electronic device 570 will be backed up, etc.

In operation 527, the electronic device 210 and the fifth external electronic device 590 may be connected.

Referring to FIG. 6, the electronic device 210 may establish a fifth communication channel 603 with the fifth external electronic device 590 using the communication module 213. For example, the electronic device 210 may establish the fifth communication channel 603 with the fifth external electronic device 590 using the identified information of the fifth external electronic device 590.

In operation 529, the electronic device 210 may transmit at least part of the second data to the fifth external electronic device 590.

Referring to FIG. 6, the electronic device 210 may transmit at least part of the second data to the fifth external electronic device 590 using the fifth communication channel 603.

In operation 531, the fifth external electronic device 590 may back up (store) the second data.

Referring to FIG. 6, the fifth external electronic device 590 may receive and back up (store) the second data transmitted by the electronic device 210 using the fifth communication channel 603.

According to operations described in FIGS. 5 and 6, the electronic device 210 may receive the first data and the second data from each of a plurality of electronic devices, e.g., the first external electronic device 230 and the fourth external electronic device 570 using the first communication channel 201 and the fourth communication channel 601. The electronic device 210 may perform an operation to back up the first data and the second data received from each of the first external electronic device 230 and the fourth external electronic device 570 to the second external electronic device 250 and the fifth external electronic device 590 using the second communication channel 203 and the fifth communication channel 603.

According to an embodiment, the first communication channel 201 and the fourth communication channel 601 may be communication channels of a 60 GHz frequency band. For example, each of the first external electronic device 230 and the fourth external electronic device 570 may upload a large amount of files to the electronic device 210 in a short time using the communication channel of the 60 GHz frequency band. For example, the second communication channel 203 and the fifth communication channel 603 may be communication channels of an Ethernet communication, a Wi-Fi communication, and/or the like. For example, the electronic device 210 may upload the large amount of files of which upload is completed to the second external electronic device 250 and the fifth external electronic device 590, respectively using the communication channel of the Ethernet communication, the Wi-Fi communication, and/or the like.

Figure 7:
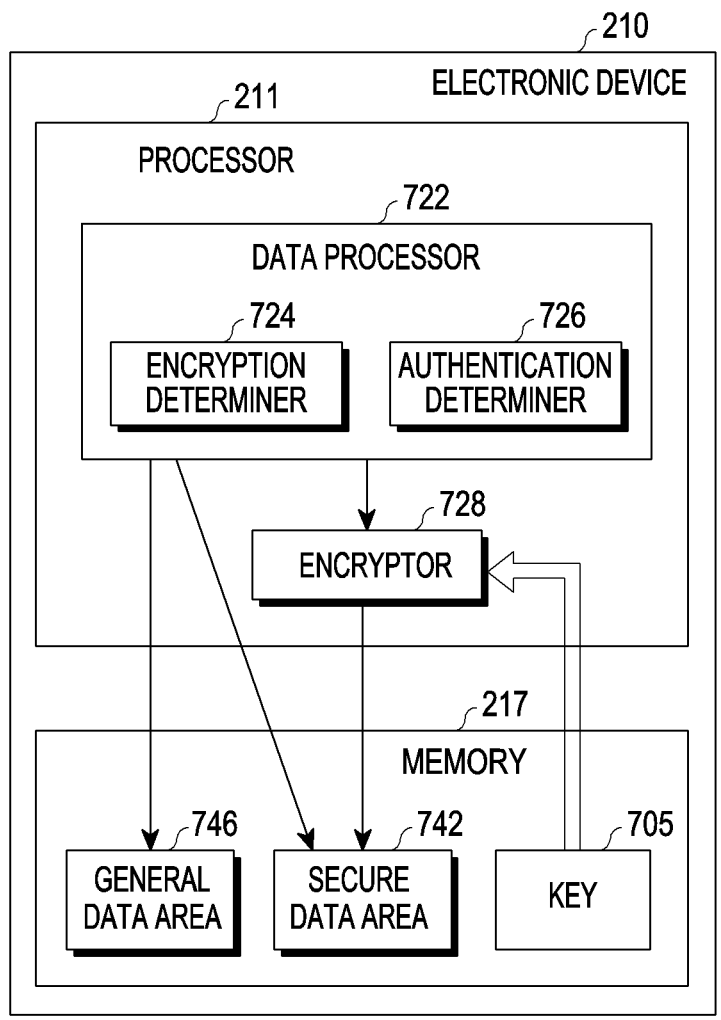
FIG. 7 is a diagram illustrating detailed components of a processor and a memory included in an electronic device according to various embodiments.

FIG. 7 is a diagram illustrating detailed components of a processor 211 and a memory 217 included in an electronic device 210 according to various embodiments.

Referring to FIG. 7, the processor 211 of the electronic device 210 may include a data processor 722 and an encryptor 728.

According to an embodiment, the data processor 722 may process data received from a first external electronic device 230 connected with the electronic device 210. For example, the data processor 722 may include an encryption determiner 724 and an authentication determiner 726. The encryption determiner 724 may determine whether the data received from the first external electronic device 230 is encrypted data. The authentication determiner 726 may determine information related to authentication of the first external electronic device 230.

According to an embodiment, the encryptor 728 may encrypt the data received from the first external electronic device 230.

According to an embodiment, a memory 217 of the electronic device 210 may include a secure data area 742 and a general data area 746.

According to an embodiment, if the electronic device 210 receives data from the first external electronic device 230, the encryption determiner 724 of the data processor 722 may determine whether the data is encrypted data, and the authentication determiner 726 may determine information related to authentication of the first external electronic device 230. For example, if the data is the encrypted data, or the data is encrypted through the encryptor 728, the data may be stored in the secure data area 742, and the data may stored in the general data area 746 if the encryption determiner 724 determines that there is no need for encryption of the data. For example, if the data is encrypted data, the electronic device 210 may store the data in the secure data area 742 or the general data area 746 of the memory 217. For example, when storing the data, the electronic device 210 may designate the secure data area 742 or the general data area 746 as a storage area based on the information related to authentication identified by the authentication determiner 726. For example, the authentication determiner 726 of the electronic device 210 may identify a corresponding designated storage area or generate a new storage area based on the information related to authentication. As another example, as a result of the determination by the authentication determiner 726, if information which satisfies a designated condition to be stored in the secure data area 742 is included in the data, the data may be stored in the secure data area 742. Otherwise, the data may be stored in the general data area 746.

According to an embodiment, if the data received from the first external electronic device 230 is not encrypted data, the encryption determiner 724 of the electronic device 210 may transmit the data to the encryptor 728, and the encryptor 728 may perform an encryption operation on the data. The encryptor 728 may encrypt the data to store it in the secure data area 742, thereby preventing a security issue of data received from a personal device. When encrypting the data, the encryptor 728 may use key information 705 (encryption key information) stored in the memory 217, for example, the key information 705 may be transmitted to the first external electronic device 230 which transmits the data or the second external electronic device 250 to which the data will be backed up.

According to the described embodiment of the electronic device 210 of FIG. 7, the electronic device 210 may generate a storage area or identify a designated storage area using information related to authentication of a first external electronic device 230.

In the described embodiment of FIG. 7, the encryption determiner 724 and the authentication determiner 726 of the data processor 722 have been separately described, but the encryption determiner 724 and the authentication determiner 726 may be implemented as one module.

Figure 8:
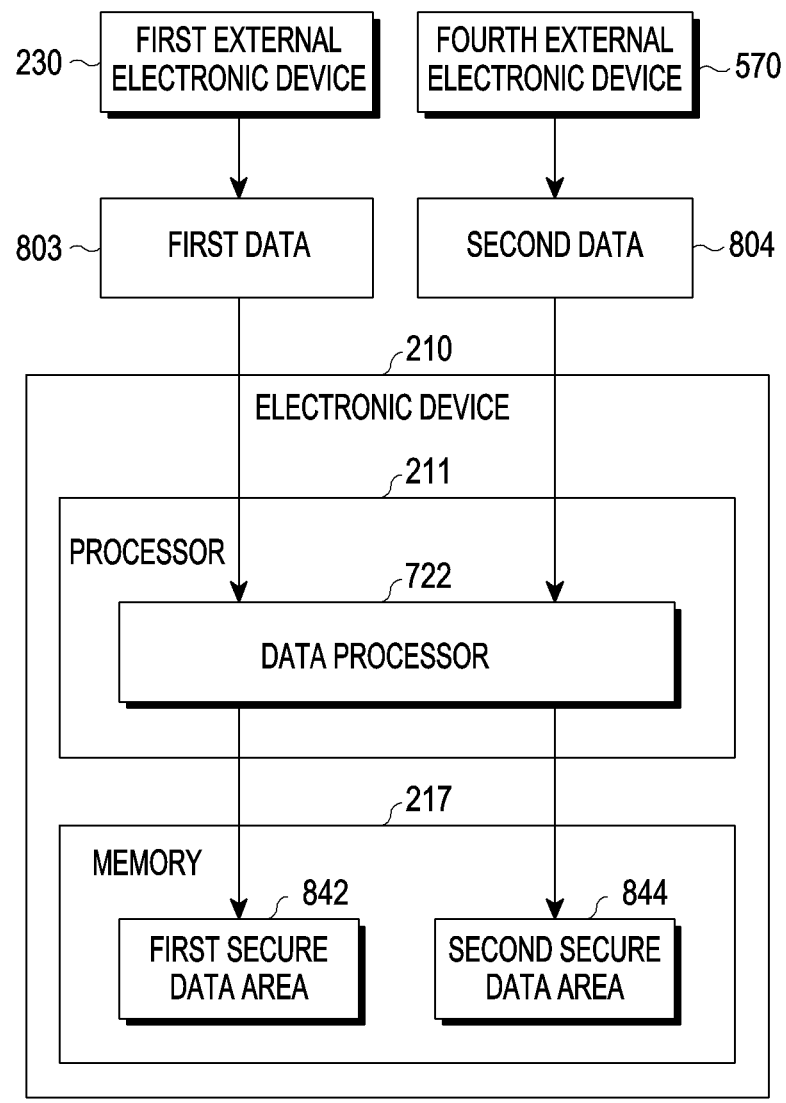
FIG. 8 is a diagram illustrating detailed components of a processor and a memory included in an electronic device according to various embodiments.

FIG. 8 is a diagram illustrating detailed components of a processor 211 and a memory 217 included in an electronic device 210 according to various embodiments.

Referring to FIG. 8, the processor 211 of the electronic device 210 may include a data processor 722. The memory 217 of the electronic device 210 may include a first secure data area 842 and a second secure data area 844.

In each component of the electronic device 210 of FIG. 8, a component having the same name as each component of the electronic device 210 of FIG. 7 may perform the same operation as each component of FIG. 7.

According to an embodiment, although not illustrated in FIG. 8, the data processor 722 may include an encryption determiner (e.g., an encryption determiner 724) and an authentication determiner (e.g., an authentication determiner 726) as shown in FIG. 7. In addition, the processor 211 may further include an encryptor (e.g., an encryptor 728) as shown in FIG. 7. In addition, the memory 217 may further include a general data area (e.g., a general data area 746) as shown in FIG. 7.

Referring to FIG. 8, the electronic device 210 may receive data from external electronic devices. For example, the electronic device 210 may receive first data 803 from a first external electronic device 230, and receive second data 804 from a fourth external electronic device 570.

According to an embodiment, the electronic device 210 may store the first data 803 and the second data 804 in separate storage areas of the memory 217, respectively based on information related to authentication of the first external electronic device 230 and information related to authentication of the fourth external electronic device 570. For example, the information related to authentication of the first external electronic device 230 may be information included in the first data 803 or received from the first external electronic device 230. For example, the information related to authentication of the fourth external electronic device 570 may be information included in the second data 804 or received from the fourth external electronic device 570. For example, the storage area may be a newly generated or designated area. According to an embodiment, the electronic device 210 may store the first data 803 in the first secure data area 842 and the second data 804 in the second secure data area 844. For example, if the electronic device 210 receives the first data 803 from the first external electronic device 230, the data processor 722 of the electronic device 210 may determine whether the first data 803 is encrypted and/or information related to authentication of the first data 803. The data processor 722 may allow the first data 803 to be stored in the first secure data area 842 based on the determination result. The first secure data area 842 may be an area designated to correspond to the first external electronic device 230. For another example, if the electronic device 210 receives the second data 804 from the fourth external electronic device 570, the data processor 722 of the electronic device 210 may determine whether the second data 804 is encrypted and/or information related to authentication of the second data 804. The data processor 722 may allow the second data 804 to be stored in the second secure data area 844 based on the determination result. The second secure data area 844 may be an area designated to correspond to the second external electronic device 570.

Figure 9:
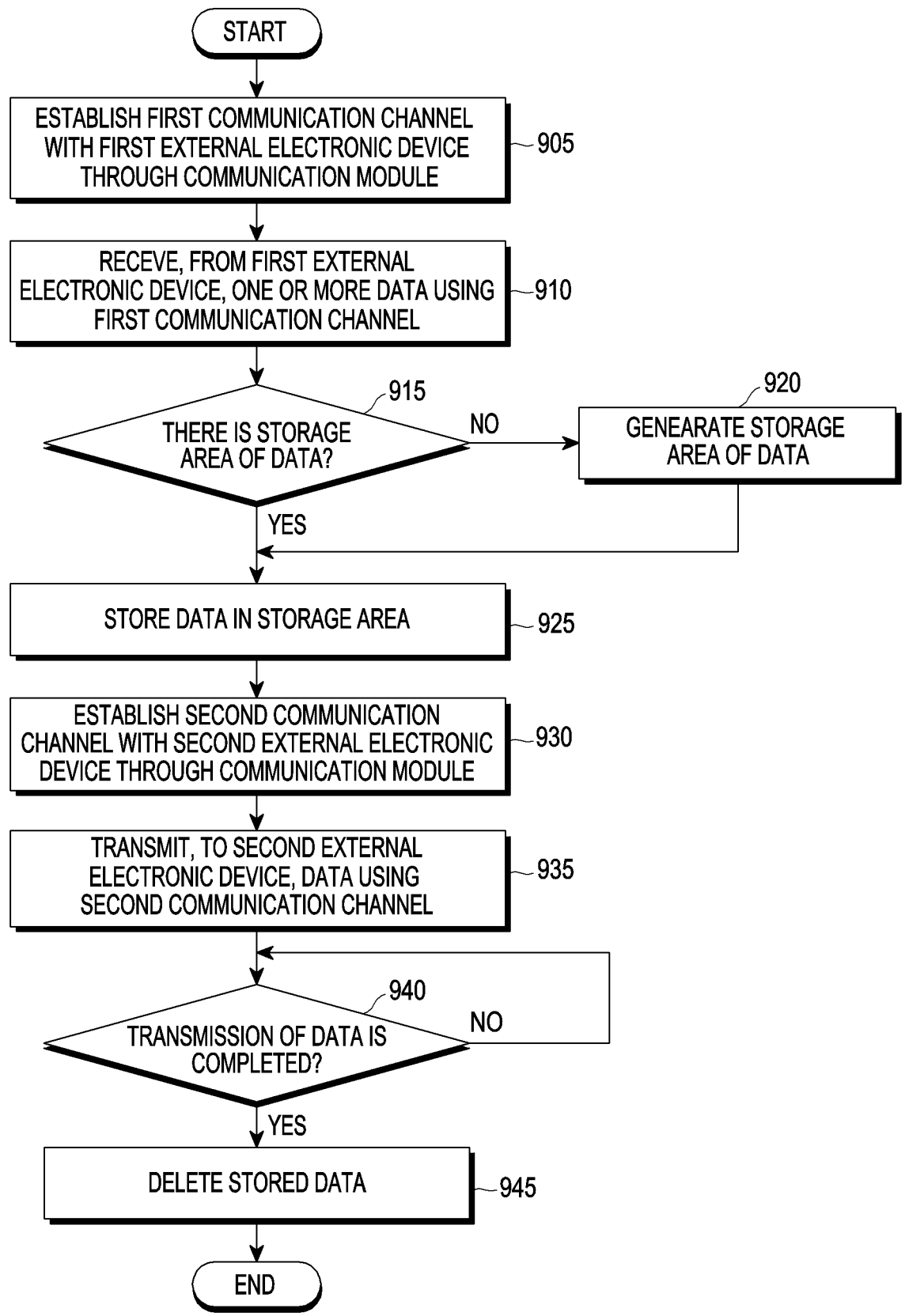
FIG. 9 is a flowchart illustrating an operation to control a data communication of an electronic device according to various embodiments.

FIG. 9 is a flowchart illustrating an operation to control a data communication of an electronic device 210 according to various embodiments.

Referring to FIG. 9, the electronic device 210 (e.g., a processor 211) may transmit and receive data with a first external electronic device 230 using a first communication channel 201. The electronic device 210 may separately store data received from the first external electronic device 230 in at least one of a generated storage area or a designated storage area using information related to authentication of the first external electronic device 230. The electronic device 210 may identify a second external electronic device 250 corresponding to a service to back up the data based on the information related to authentication of the first external electronic device 230, and transmit the data to the second external electronic device 250 using a second communication channel 203 thereby the second external electronic device 250 may back up (store) the data. For example, after backing up the data to the second external electronic device 250, the electronic device 210 may delete the data according to a designated condition.

In operation 905, the electronic device 210 may establish the first communication channel 201 with the first external electronic device 230 through a communication module 213.

According to an embodiment, the first external electronic device 230 may activate a first communication function for the first communication connection 201 with the electronic device 210, and establish the first communication connection 201 with the electronic device 210 according to the activation of the first communication function. For example, the first communication channel 201 may be a communication channel of a 60 GHz frequency band.

In operation 910, the electronic device 210 may receive one or more data from the first external electronic device 230 using the first communication channel 201.

According to an embodiment, if the electronic device 210 establishes a communication channel of a 60 GHz frequency band with the first external electronic device 230, an operation of connecting a communication between the electronic device 210 and the first external electronic device 230 may perform an association and authentication operation which is based on a 802.11ad standard. The authentication operation may include, for example, authentication of the communication module 213 of the electronic device 210, and may further include authentication of the electronic device 210 according to an authentication scheme.

According to an embodiment, the one or more data may include data to be backed up including at least part of the information related to authentication of the first external electronic device 230. For example, if the one or more data is the data to be backed up including the at least part of information related to authentication of the first external electronic device 230, the electronic device 210 may identify the information related to authentication included in the data and perform operations to be described below using the identified information related to authentication when receiving the one or more data. For example, the electronic device 210 may perform an authentication operation of the first external electronic device 230 based on the information related to authentication of the first external electronic device 230. For example, the information related to the authentication may be encrypted to protect information of a user of the first external electronic device 230.

In operation 915, the electronic device 210 may determine whether there is an area for storing the data in the memory 217.

According to an embodiment, the electronic device 210 may determine whether there is a designated storage area which corresponds to the first external electronic device 230 in the electronic device 210 using the information related to authentication of the first external electronic device 230. For example, the electronic device 210 may determine whether there is the designated storage area which corresponds to the first external electronic device 230 in the electronic device 210 using information related to the first external electronic device 230 among the information related to authentication.

In operation 915, if the electronic device 210 determines that there is the storage area of the data, the electronic device 210 may perform operation 925. Otherwise, the electronic device 210 may perform operation 920.

In operation 920, if there is no storage area of the data, the electronic device 210 may generate the storage area of the data in the memory 217. For example, the electronic device 210 may generate the storage area of the data in at least one of the general data area 746 or the secure data area 742 of the memory 217.

According to an embodiment, the storage area of the data corresponding to the first external electronic device 230 may be generated using the information related to the first external electronic device 230 included in the information related to authentication, for example, the information related to authentication of the first external electronic device 230.

In operation 925, if there is the storage area of the data, the electronic device 210 may store the data in the storage area.

According to an embodiment, the electronic device 210 may store the data in the storage area corresponding to the first external electronic device 230.

In operation 930, the electronic device 210 may establish the second communication channel 203 with the second external electronic device 250 through the communication module 213.

According to an embodiment, the electronic device 210 may establish the second communication channel 203 with the second external electronic device 250 through the communication module 213 using the information related to authentication of the first external electronic device 230. For example, the second communication channel 203 may be a communication channel of an Ethernet communication, a Wi-Fi communication, and/or the like.

According to an embodiment, the electronic device 210 may identify cloud service information to which the data included in the information related to authentication of the first external electronic device 230 will be backed up and/or information of the second external electronic device 250, and may establish the second communication channel 203 with the second external electronic device 250 through the communication module 213 based on the identified cloud service information and/or the identified information of the second external electronic device 250.

In operation 935, the electronic device 210 may transmit the data stored in the storage area to the second external electronic device 250 using the second communication channel.

In operation 940, the electronic device 210 may determine whether the transmission of the data is completed.

In operation 940, if the electronic device 210 determines that the transmission of the data is completed, the electronic device 210 may perform operation 945. Otherwise, the electronic device may perform operation 940 again.

If the transmission of the data is completed in operation 945, the electronic device 210 may delete the data stored in the storage area of the electronic device 210.

According to an embodiment, if a designated condition is satisfied, the electronic device 210 may delete the data stored in the storage area of the electronic device 210. For example, the designated condition may include a size, a priority, and/or a valid period, etc. of the data.

According to another embodiment, the electronic device 210 may delete the data stored in the storage area based on information included in the data. For example, the data may include a valid period for storing the data in the electronic device 210.

In the described embodiment of FIG. 9, a 1:1 communication connection between the electronic device 210 and the first external electronic device 230 has been described. However, according to another embodiment, a 1:N connection among the electronic device 210 and a plurality of external electronic devices is also possible, and the electronic device 210 may interact with each of the plurality of external electronic devices. For example, if the electronic device 210 is connected to a plurality of external electronic devices instead of a single device and receives data from each of the plurality of external electronic devices, the electronic device 210 may receive data of other external electronic devices after data reception of one external electronic device is terminated, or receive, from the plurality of external electronic devices, data sequentially or in parallel according to a designated scheduling scheme. As another example, the electronic device 210 may determine an order of receiving data of a plurality of external electronic devices based on various information such as a priority of a plurality of connected external electronic devices, a priority of data of the plurality of external electronic devices, and/or situation information of an external electronic device and/or an electronic device, etc.

In the described embodiment of FIG. 9, it has been described that the electronic device 210 receives one or more data from the first external electronic device 230 using the first communication. However, according to another embodiment, the electronic device 210 may transmit one or more data to the first external electronic device 230 using the first communication or the second communication.

In the described embodiment of FIG. 9, it has been described that the electronic device 210 performs an authentication operation after establishing the first communication channel 201 with the first external electronic device 230. However, according to another embodiment, the electronic device 210 may perform an authentication operation of the first external electronic device 230 before connecting a communication with the first external electronic device 230. According to another embodiment, a user inputs authentication information directly through the electronic device 210 or the first external electronic device 230, and then the second external electronic device 250 may perform an authentication operation. For example, the second external electronic device 250 may perform an authentication operation through iris recognition, fingerprint recognition, face recognition, password recognition, and/or the like of a user through the electronic device 210 or the first external electronic device 230, and perform establishment of the second communication channel and/or the described operations after the establishment of the second communication channel if the authentication is completed.

In the described embodiment of FIG. 9, it has been described that the electronic device 210 stores data received from the first external electronic device 230 in a designated storage area or a generated storage area which corresponds to the first external electronic device 230 in the electronic device 210 using information related to authentication included in one or more data. However, according to another embodiment, the electronic device 210 may receive information related to authentication of the first external electronic device 230 before, while, or after receiving the one or more data from the first external electronic device 230, and perform an operation of storing data based on the received information related to authentication. For example, if the information related to authentication is already received before the reception of the one or more data from the first external electronic device 230, the electronic device 210 may store data received from the first external electronic device 230 using the information related to authentication.

In the described embodiment of FIG. 9, it has been described that the electronic device 210 deletes data stored in the storage area. However, according to another embodiment, the electronic device 210 may reduce a size of the data or compress the data to store the reduced or compressed data without deleting the data. According to another embodiment, even if the electronic device 210 deletes the data stored in the storage area, link information of data transmitted to the second external electronic device 250, and/or the like may be stored.

As in the described embodiment of FIG. 9, the information related to authentication of the first external electronic device 230 may be used for the electronic device 210 to store data received from the first external electronic device 230 in the memory 217, and to access the second external electronic device 250.

In addition to the described embodiment of FIG. 9, the electronic device 210 may transmit information related to the processing of the data to the first external electronic device 230 using the communication module 213. For example, the information related to the processing of the data may include a backup progress state of the data, and/or deletion schedule information of the data stored in the storage area, etc. For example, the information related to the processing of the data may be information (e.g., backup completion) received by the electronic device 210 from the second external electronic device 250.

According to an embodiment, the first external electronic device 230 may directly receive the information (e.g., backup completion) related to the processing of the data from the second external electronic device 250. For example, if the first external electronic device 230 transmits data to the electronic device 210 and then moves out of the coverage area 406 of the first communication, the first external electronic device 230 may directly receive the information related to the processing of the data from the second external electronic device 250.

Figure 10:
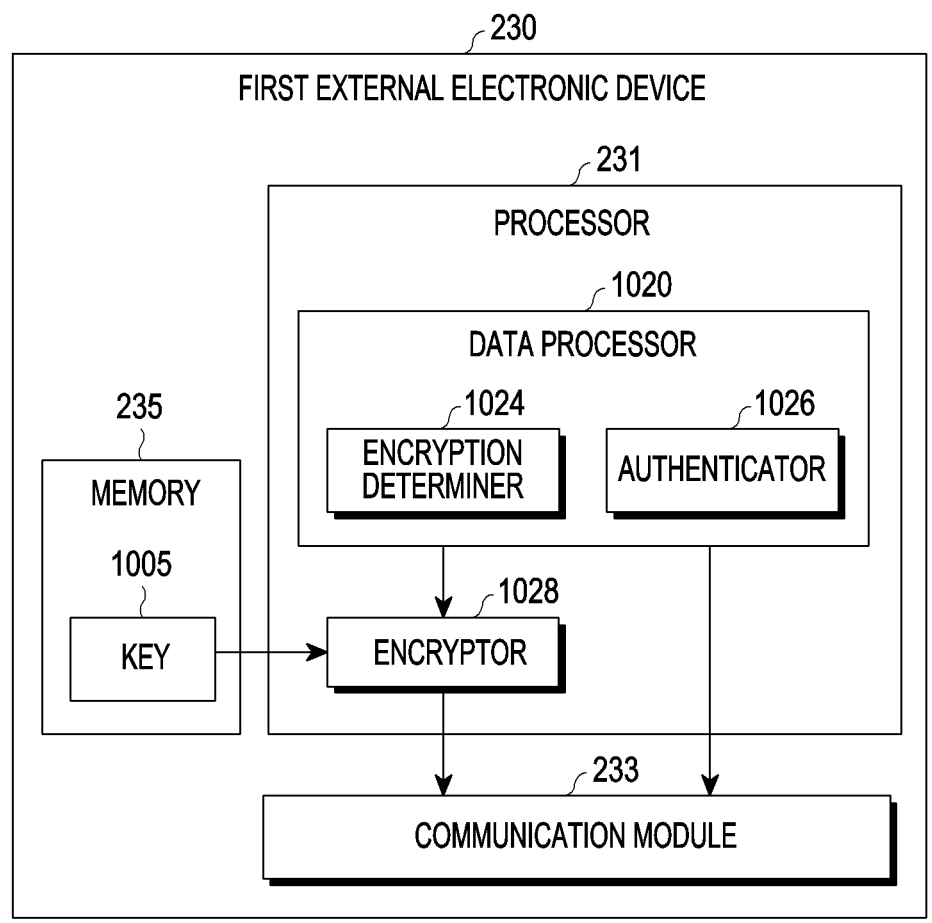
FIG. 10 is a diagram illustrating detailed components of a processor and a communication module included in a first external electronic device according to various embodiments.

FIG. 10 is a diagram illustrating detailed components of a processor 231 and a communication module 233 included in a first external electronic device 230 according to various embodiments.

Referring to FIG. 10, the processor 231 of the first external electronic device 230 may include a data processor 1020 and an encryptor 1028. For example, the data processor 1020 may include an encryption determiner 1024 and an authenticator 1026. The encryption determiner 1024 may determine whether encryption of data stored in the memory 235 is required, and transmit the data to the encryptor 1028 if the encryption of the data is required. The encryptor 1028 may encrypt the data. The authenticator 1026 may add information related to authentication to the data which will be transmitted to the electronic device 210. Alternatively, the authenticator 1026 may transmit only the information related to authentication to the electronic device 210. For example, the information related to authentication may be used when the external electronic device 210 stores the data, and the external electronic device 210 receives the data which the first external electronic device 230 will transmit. Alternatively, the information related to authentication may be used when the electronic device 210 transmits and backs up the data to a second external electronic device 250.

Data which is generated according to operations of components included in the processor 231 and stored in the memory 235 may be transmitted to the electronic device 210 through the communication module 233. For example, the first external electronic device 230 may establish a first communication channel 201 with the electronic device 210 using the communication module 233. For example, the first external electronic device 230 may activate a first communication function using a user's manipulation, proximity to the electronic device, identification of the electronic device through a short-range communication, and/or the like, and activate the communication module 233 according to activation of the first communication function to establish the first communication channel 201 with the electronic device 210. For example, the first external electronic device 230 may transmit, to the electronic device 210, data including at least part of information related to authentication, data which does not include the information related to authentication, and/or the information related to authentication using the first communication channel 201. For example, when transmitting data to the electronic device 210, the first external electronic device 230 may transmit key information 1005 (encryption key information) stored in the memory 235 along with the data, or may not transmit the encryption key information 1005.

According to the structure of the first external electronic device 230 in FIG. 10 as described above, the first external electronic device 230 may establish the first communication channel 201 with the electronic device 210 for transmission and reception of data. The first external electronic device 230 may transmit, to the electronic device 210, information related to authentication of the first external electronic device 230 so that a storage area which will store data which is transmitted using the first communication channel 201 is generated or the electronic device 210 may identify a designated storage area.

According to an embodiment, the first communication channel 203 may be a communication channel of a 60 GHz frequency band. In this case, the first external electronic device 230 may transmit data at high speed through the first communication channel 201. For example, when transmission of the data is completed, the first communication function related to the first communication may be deactivated.

According to an embodiment, the first external electronic device 230 may receive, from the electronic device 210 or the second external electronic device 250, information related to the transmitted data through the communication module 233, and display the information related to the transmitted data on a display 237. For example, after transmitting data, the first external electronic device 230 may delete the data if a designated condition is satisfied.

According to various embodiments, an electronic device 210 is provided, and the electronic device 210 may include a housing structure, a user interface (e.g., an input device 216) located in the housing structure, a network interface (e.g., a communication module 213) which is wiredly or wirelessly connectable, a wireless communication circuit (e.g., a communication module 213) configured to communicate with an external device using a frequency between 10 GHz and 100 GHz, a processor 211 which is located in the housing structure, and operatively connected with the user interface, the wireless network interface, and the wireless communication circuit, and a memory 217 which is located in the housing structure, and operatively connected with the processor. The memory may store instructions that cause, when executed, the processor to: establish a first communication channel 201 with a first external device (e.g., a first external electronic device 230) using the wireless communication circuit, receive authentication information from the first external device using the first communication channel, receive data from the first external device using the first communication channel while or after receiving the authentication information, store the received data at least temporarily in the memory, establish a second communication channel 203 with a second external device (e.g., a second external electronic device 250), using the authentication information, via the network interface, and transmit the stored data to the second external device using the second communication channel.

According to various embodiments, the first external device may be a mobile device related to a user account, and the second external device may be a server related to the user account.

According to various embodiments, the instructions may cause the processor to delete the stored data after the transmission of the data.

According to various embodiments, at least part of the housing structure may include or form a kiosk structure.

According to various embodiments, the user interface may include a touch screen display.

According to various embodiments, the frequency may be 60 GHz.

According to various embodiments, the wireless communication circuit may be configured to support a WiGig specification.

According to various embodiments, the data may include backup data stored in the electronic device.

According to various embodiments, the instructions may cause the processor to store the data at least temporarily in a designated storage area of the memory or a storage area generated in the memory using the authentication information.

According to various embodiments, the instructions may cause the processor to encrypt the data if the data is not encrypted data.

According to various embodiments, the instructions may cause the processor to establish the first communication channel with the first external device using the wireless communication circuit based on a previous connection record with the first external device which is stored in the memory.

Figure 11:
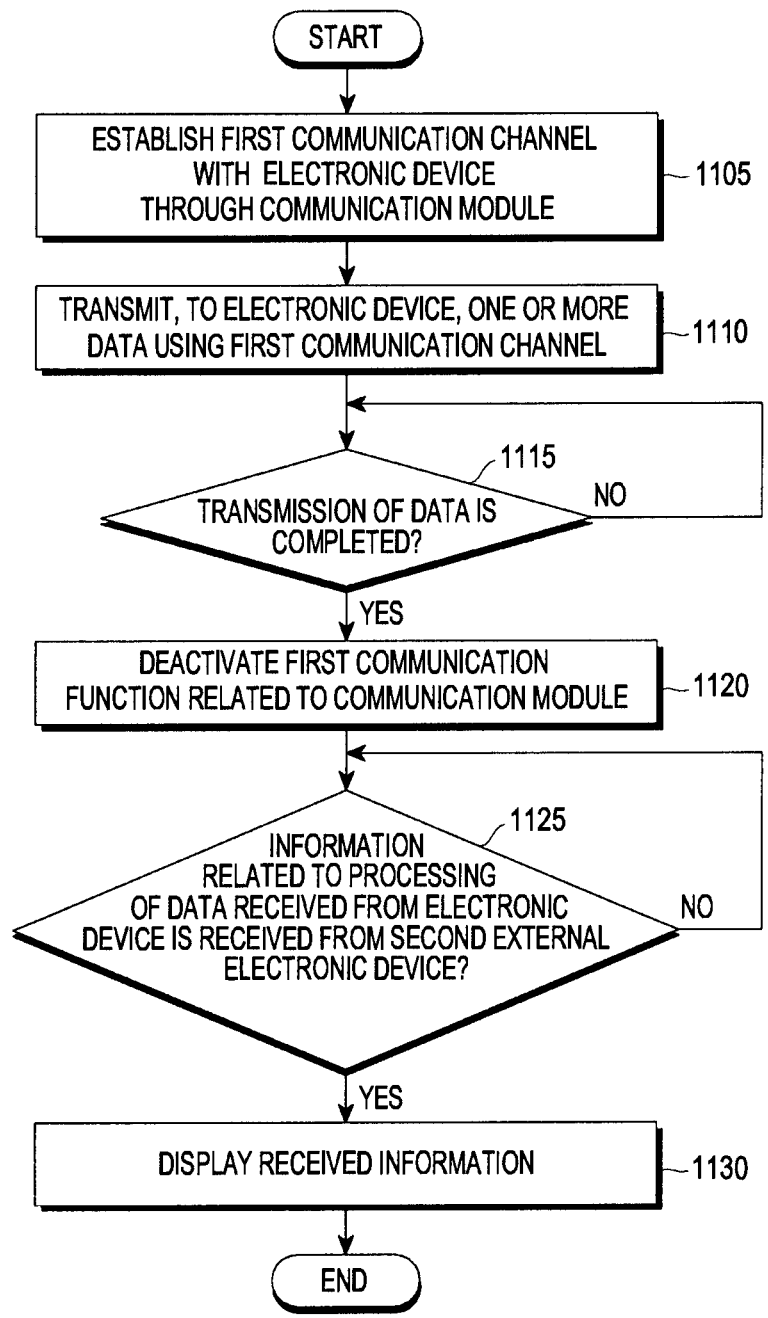
FIG. 11 is a flowchart illustrating an operation to control a data communication of a first external electronic device according to various embodiments.

FIG. 11 is a flowchart illustrating an operation to control a data communication of a first external electronic device 230 according to various embodiments.

In operation 1105, a first external electronic device (e.g., a processor 231) may establish a first communication channel 201 with an electronic device 210 through a communication module 233.

According to an embodiment, the communication module 233 may support a communication for one or more designated frequency bands. For example, the communication module may include a circuit supporting a communication (e.g., WiGig) of a 60 GHz frequency band.

In operation 1110, the first external electronic device 230 may transmit one or more data to the electronic device 210 using a first communication channel.

According to an embodiment, the one or more data may include data which includes at least part of information related to authentication of the first external electronic device 230, data which does not include the information related to authentication of the first external electronic device 230, and/or the information related to authentication of the first external electronic device 230.

In operation 1115, the first external electronic device 230 may determine whether transmission of the data is completed.

In operation 1115, if the first external electronic device 230 determines that the transmission of the data is completed, operation 1120 may be performed. Otherwise, operation 1115 may be performed again.

In operation 1120, the first external electronic device 230 may deactivate a first communication function related to the communication module 233.

According to one embodiment, the first external electronic device 230 may automatically deactivate the first communication function related to the communication module 233 when the transmission of the data is completed, so power which is unnecessarily consumed due to maintenance of activation of the communication module 233 may be reduced. For example, a communication of the 60 GHz frequency band has high power consumption, so if the first communication is the communication of the 60 GHz frequency band, and the first communication function is deactivated after data transmission is completed, there may be an effect of reducing power consumption.

According to another embodiment, the first external electronic device 230 may automatically deactivate the first communication function when a designated condition such as a lapse of designated time after completion of the transmission of the data, and/or the like is satisfied.

According to another embodiment, when the transmission of the data is completed, the first external electronic device 230 may display a screen which asks whether to deactivate the first communication function related to the communication module 233 on a display 237, and may deactivate the first communication function related to the module 233 based on a user input through an input device 238.

In operation 1125, the first external electronic device 230 may determine whether information related to the processing of the data is received from the second external electronic device 250 and the electronic device 210.

According to an embodiment, the electronic device 210 which receives the one or more data from the first external electronic device 230 may transmit, to the second external electronic device 250, the data using the second communication, and the second external electronic device 250 which receives the data from the electronic device 210 may transmit, to the first external electronic device 230, information related to processing of the data using a communication module (e.g., a communication module 190). For example, when receiving data from the electronic device 210, the second external electronic device 250 may transmit, to the first external electronic device 230, a message notifying that reception (backup) of the data is started. For example, when receiving the data from the electronic device 210, the second external electronic device 250 may predict a time point at which the reception (backup) of the data will be completed based on capacity of the data, and/or the like, and transmit, to the first external electronic device 230, the predicted time point at which the reception (backup) of the data will be completed. For example, when receiving the data from the electronic device 210, the second external electronic device 250 may transmit, to the first external electronic device 230, a message notifying that an error occurs if an error occurs. For example, the second external electronic device 250 may transmit, to the first external electronic device 230, a message notifying that the reception of the data is completed when the reception of the data from the electronic device 210 is completed.

In operation 1125, if the first external electronic device 230 receives, from the second external electronic device 250 and the electronic device 210, information related to the processing of the data, the first external electronic device 230 may perform operation 1130. Otherwise, the first external electronic device 230 may perform operation 1125 again.

In operation 1130, the first external electronic device 230 may display the received information on the display 237 of the first external electronic device 230.

According to one embodiment, the first external electronic device 230 may display the received information on the display 237 in a form of pop-up window.

Figure 12:
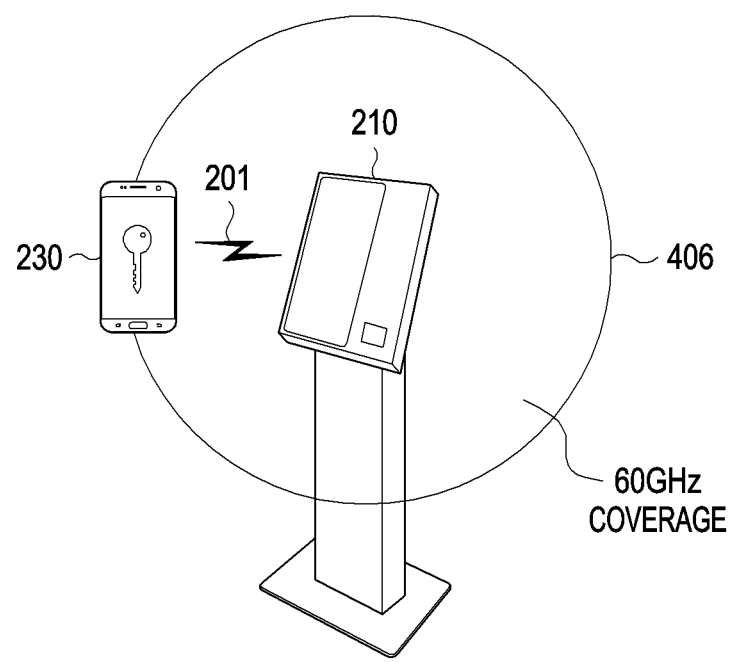
FIG. 12 is a diagram for describing an operation to control a communication of encrypted data of an electronic device according to various embodiments.

FIG. 12 is a diagram for describing an operation to control a communication of encrypted data of an electronic device 210 according to various embodiments.

Referring to FIG. 12, a first external electronic device 230 may be located within a coverage area 406 of a first communication where the first communication with electronic device 210 is possible, and a first communication channel 201 may be established between the electronic device 210 and the external electronic devices 230.

According to an embodiment, the first external electronic device 230 may transmit, to the electronic device 210, encrypted data using the first communication channel 201, and the electronic device 210 may receive the encrypted data. For example, the first external electronic device 230 may transmit, to the electronic device 210, the encrypted data using the first communication channel 201, but, may not transmit key information to the electronic device 210. For example, the electronic device 210 may perform only a function of transmitting the encrypted data without decrypting the encrypted data received from the first external electronic device 230, so the first external electronic device 230 may not transmit the key information to the electronic device 210.

In the described embodiment of FIG. 12, an embodiment in which the first external electronic device 230 transmits encrypted data using the first communication channel 201 to the electronic device 210 has been described. However, according to another embodiment, the first external electronic device 230 may transmit unencrypted data to the electronic device 210 using the first communication channel 201. For example, the electronic device 210 may receive the unencrypted data from the first external electronic device 230, and then the electronic device 210 may perform an operation to encrypt the unencrypted data when storing the unencrypted data in the electronic device 210.

Figure 13A:
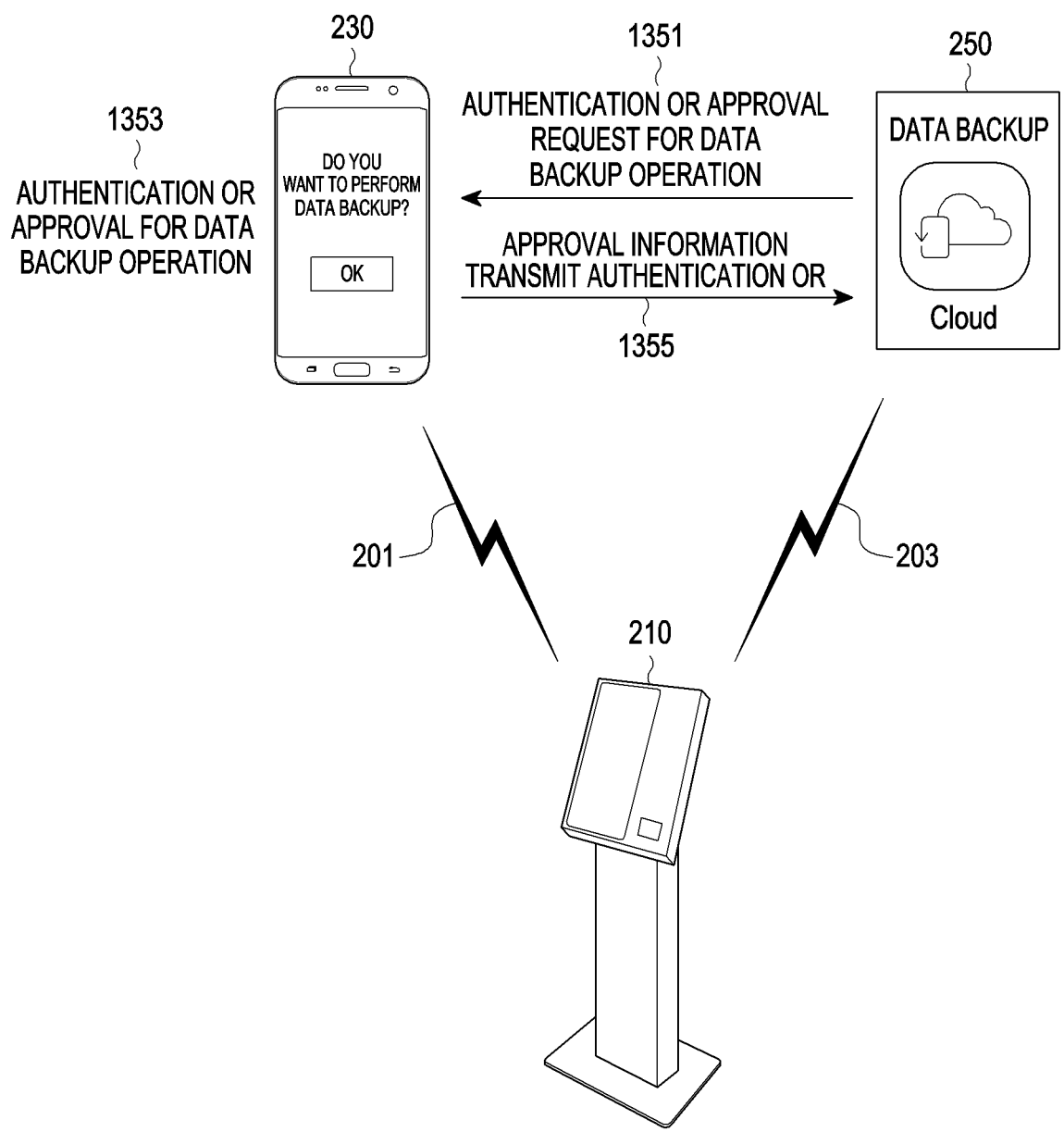
FIGS. 13a and 13b are diagrams for describing an operation in which an electronic device performs an authentication or approval operation with a second external electronic device to backup data of a first external electronic device according to various embodiments.
Figure 13B:
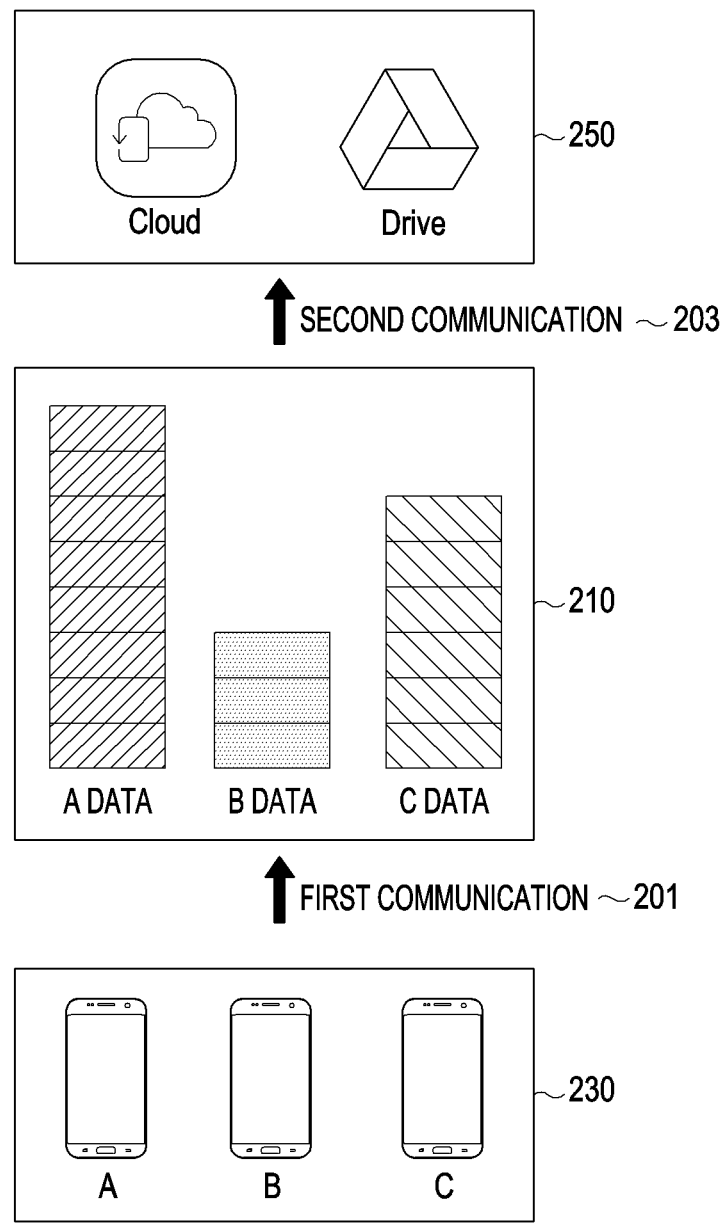

FIGS. 13a and 13b are diagrams for describing an operation in which an electronic device 210 performs an authentication or approval operation with a second external electronic device 250 to backup data of a first external electronic device 230 according to various embodiments.

According to an embodiment, the electronic device 210 may communicate with the second external electronic device 250 to which data will be backed up, and the data is received from the first external electronic device 230 using a first communication channel 201 which is generated using a communication module. For example, the electronic device 210 may establish a second communication channel 203 with the second external electronic device 250 using a communication module 213.

For example, the electronic device 210 may determine the second external electronic device 250 to be connected through the communication module 213 based on information related to authentication of the first external electronic device 230 including a type of the communication module 213, a type of the second external electronic device 250, and/or cloud service information, etc. For example, the information related to authentication of the first external electronic device 230 may be included in the received data, the electronic device 210 may separately receive the information related to authentication of the first external electronic device 230, the information related to authentication of the first external electronic device 230 may be received through an input device 216, or the information related to authentication of the first external electronic device 230 may be stored in the electronic device 210. For example, if first account (Samsung account) information is included in the information related to authentication, the received data may be backed up to a second external electronic device 250 which is a first cloud server (e.g., a Samsung cloud server) which corresponds to the first account.

According to an embodiment, as shown in FIG. 13a, the first external electronic device 230 may perform a mutual authentication operation with the second external electronic device 250 for a backup operation of the data which is transmitted to the second external electronic device 250 through the electronic device 210.

For example, in operation 1351, the second external electronic device 250 may request, from the first external electronic device 230, authentication or approval for the backup operation of the received data.

In operation 1353, the first external electronic device 230 may display information about the authentication or approval request for the backup operation on a display 237, and receive authentication or approval of the data backup operation from a user.

In operation 1355, the first external electronic device 230 may transmit, to the second external electronic device 250, information according to the authentication or approval so that the second external electronic device 250 performs a backup operation of the data.

Referring to FIG. 13b, user information may be protected by setting a valid authentication time for the second external electronic device 250.

According to an embodiment, when an electronic device 210 transmits data to the second external electronic device 250, the electronic device 210 may calculate required time and allocate the calculated time as data transmission time to the second external electronic device 250. For example, the electronic device 210 may calculate time at which transmission of the data is expected to be completed based on at least part of a communication speed between the electronic device 210 and the second external electronic device 250 and a data size. For example, when the first external electronic device 230 is a plurality of external electronic devices A, B, and C, the valid authentication time may be set based on a value which is generated by dividing a sum of data (A data+B data+C data) received from the plurality of external electronic devices by the communication speed between the electronic device 210 and the second external electronic device 250.

According to an embodiment, the transmission of the data may be stopped if the valid authentication time expires during the transmission of the data to the second external electronic device 250. For example, the second external electronic device 250 may transmit, to the first external electronic device 230, information notifying that the valid authentication time expires before completion of the data backup operation, and the first external electronic device 230 may display notification notifying that the valid authentication time expires. According to a user input for the notification, the first external electronic device 230 may transmit, to the second external electronic device 250, an instruction such as an instruction for resuming transmission of the data of which transmission is stopped, or an instruction for deleting the data of which transmission is stopped, etc. According to the transmitted instruction, the second external electronic device 250 may resume the transmission of the data of which transmission is stopped, or delete the data of which transmission is stopped.

According to an embodiment, if there is a need for a change in the valid authentication time due to a change in the communication speed between the electronic device 210 and the second external electronic device 250, notification may be provided to a user of the electronic device 210 or a plurality of external electronic devices (e.g., A, B, and/or C) (for example, when the first external electronic device 320 is the plurality of external electronic devices A, B, and C), and the valid authentication time may be changed according to setting of the user. For example, if there is a need for a change in the valid authentication time, the second external electronic device 250 may transmit information such that notification is provided to a user of external electronic devices which are currently used (for example, which are currently connectable for communication) among the plurality of external electronic devices. For example, an external electronic device which is currently used (an external electronic device with the same account) may receive the information to perform a notification operation for providing the user with the notification.

In the described embodiment of FIG. 13, it has been described that the first external electronic device 230 performs a mutual authentication operation with the second external electronic device 250 for a backup operation for data which the first external electronic device 230 transmits to the second external electronic device 250 using the electronic device 210. According to another embodiment, the second external electronic device 250 may perform an authentication operation for a backup operation of data received from the electronic device 210 using the information related to authentication.

Figure 14:
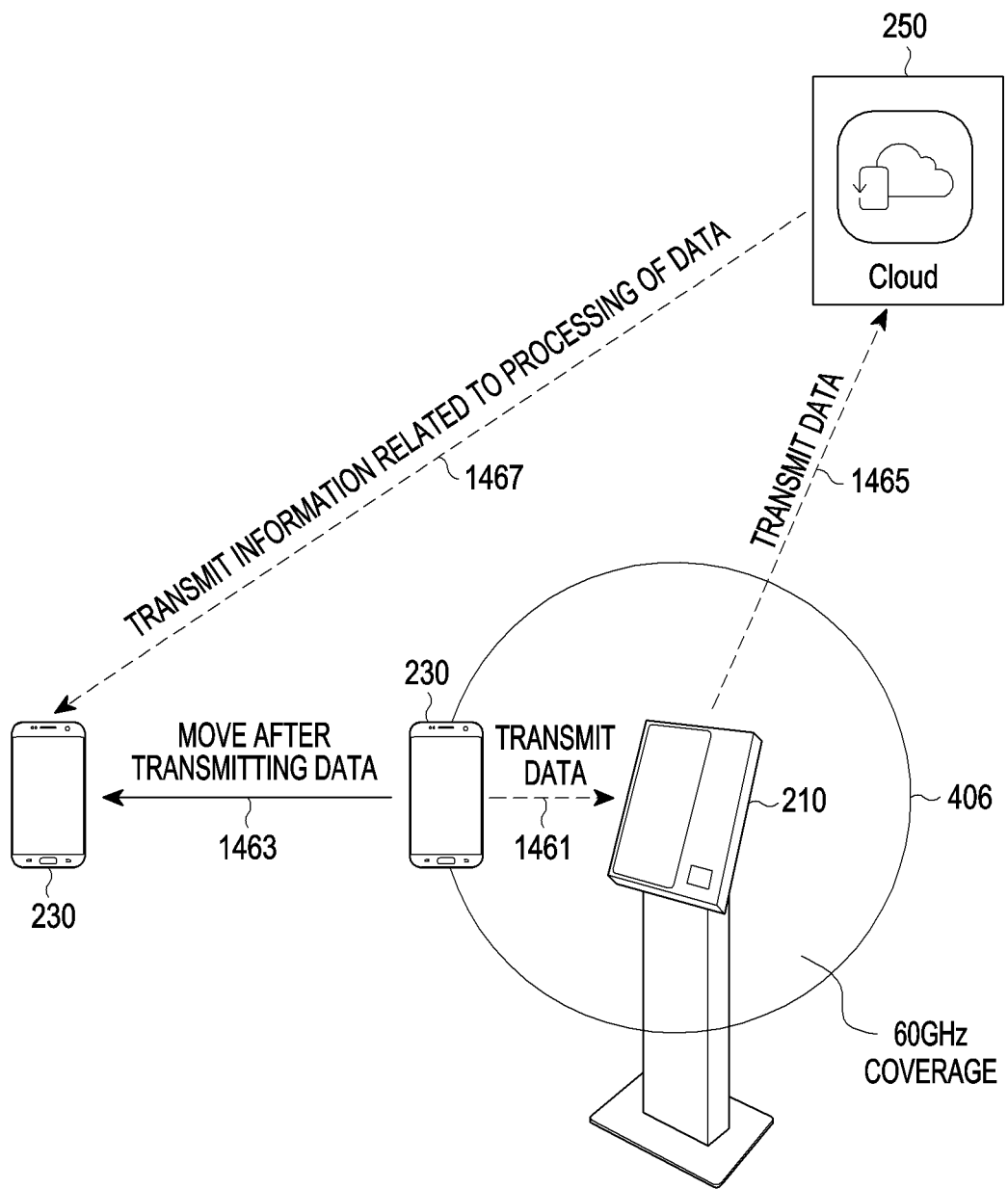
FIG. 14 is a diagram for describing an operation to receive processing related information of data when the data is backed up through an electronic device according to various embodiments.

FIG. 14 is a diagram for describing an operation to receive processing related information of data when the data is backed up through an electronic device 210 according to various embodiments.

According to an embodiment, after transmitting data to the electronic device 210 using a first communication channel 201, a first external electronic device 230 may receive, from a second external electronic device 250, information related to processing of the data using a second communication channel 203.

The electronic device 210, data which will be backed up to the second external electronic device 250 using a first communication within a first communication coverage 406 in operation 1461. The electronic device 210 receiving the data to be backed up may transmit, to the second external electronic device 250, the data to be backed up using a second communication in operation 1465. For example, after performing operation 1461, the first external electronic device 230 may move as in operation 1463, for example, a location of a first external electronic device 230 may be out of the coverage area 406 of the first communication where the first communication may be performed with an electronic device 210. Once operation 1465 is performed, the second external electronic device 250 receiving the data may transmit, to the first external electronic device 230, information related to processing of the data through a third communication in operation 1467. For example, the information related to the processing of the data may include information such as start of reception of the data, and/or completion of backup (storage) of the data, etc.

Although not shown in FIG. 14, according to an embodiment, once operation 1465 is performed, the electronic device 210 may transmit, to the first external electronic device 230, the information related to the processing of the data using the second communication. For example, the information related to the processing of the data may include information such as start of transmission of the data, and/or completion of transmission of the data, etc.

Although not illustrated in FIG. 14, according to an embodiment, the first external electronic device 230 may receive, from the second external electronic device 250, a request for information required for processing transmitted data. For example, the first external electronic device 230 may receive, from the second external electronic device 250, a request for information such as a request for account information for accessing a user account of the first external electronic device 230, a request for approval for an access to the user account, etc. After the first external electronic device 230 transmits, to the second external electronic device 250, corresponding information in response to the request for information, operation 1465 of the second external electronic device 250 is performed, and the first external electronic device 230 may receive information related to the processing of the data.

Although not illustrated in FIG. 14, according to an embodiment, the first external electronic device 230 may display the received information related to the processing of the data on a display 237 of the first external electronic device 230. For example, if the first external electronic device 230 receives, from the second external electronic device 250, information of an approval request for a user account access, etc., the first external electronic device 230 may display the information of the approval request on the display 237, and may receive, from a user, an input related to the approval request through an input device 238. For example, if the first external electronic device 230 receives the information related to the processing of the data, the first external electronic device 230 may provide a user with information notifying that the information related to the processing of the data is received using various schemes such as graphic information, sound, or an LED lamp color, etc. based on the received information.

Although not illustrated in FIG. 14, according to an embodiment, the first external electronic device 230 may perform an operation such as an operation of deleting or compressing data transmitted to the electronic device 210, etc. For example, the first external electronic device 230 may perform an operation such as an operation of deleting and compressing the data, etc. based on a result of processing the transmitted data. For example, the first external electronic device 230 may delete the data based on a designated condition such as a size, a priority, and/or valid time, etc. of a file. For example, even if the data is deleted, the first external electronic device 230 may store link information through which the data is transmitted, etc. As another example, the first external electronic device 230 may reduce or compress a size of the data to store it without deleting the data.

Figure 15:
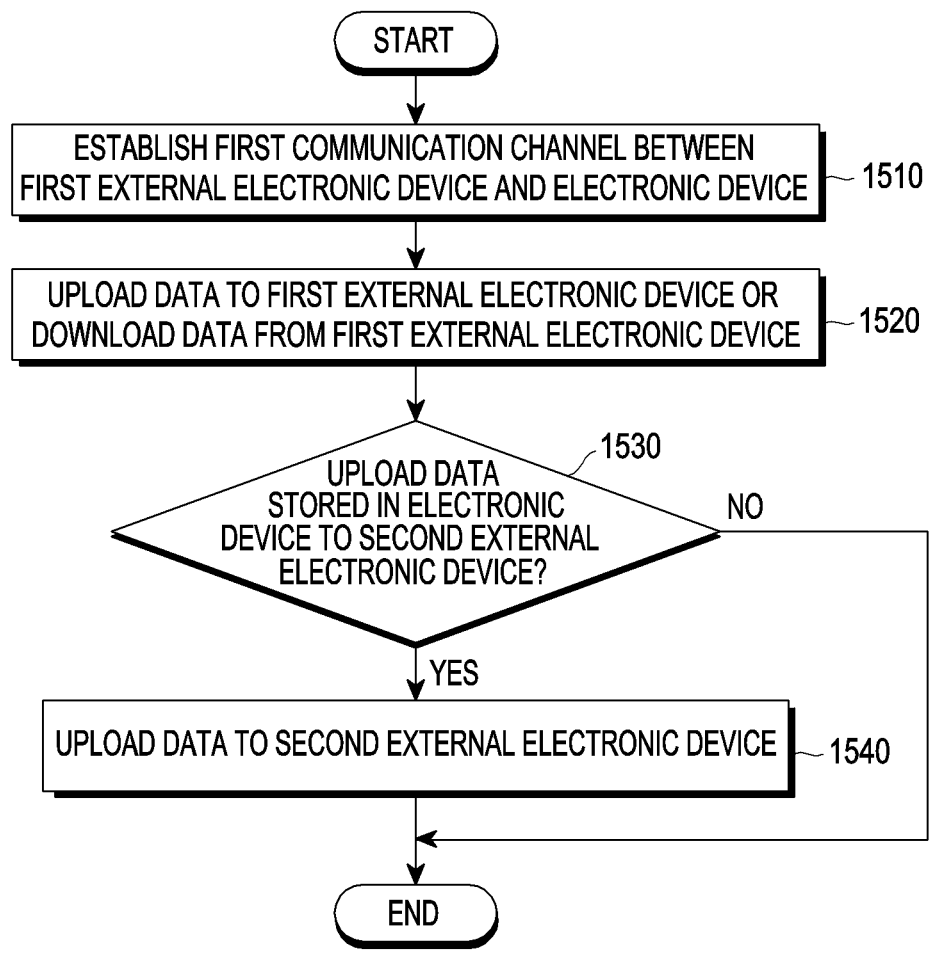
FIG. 15 is a flowchart illustrating an operation to control a data communication of an electronic device according to various embodiments.
Figure 16:
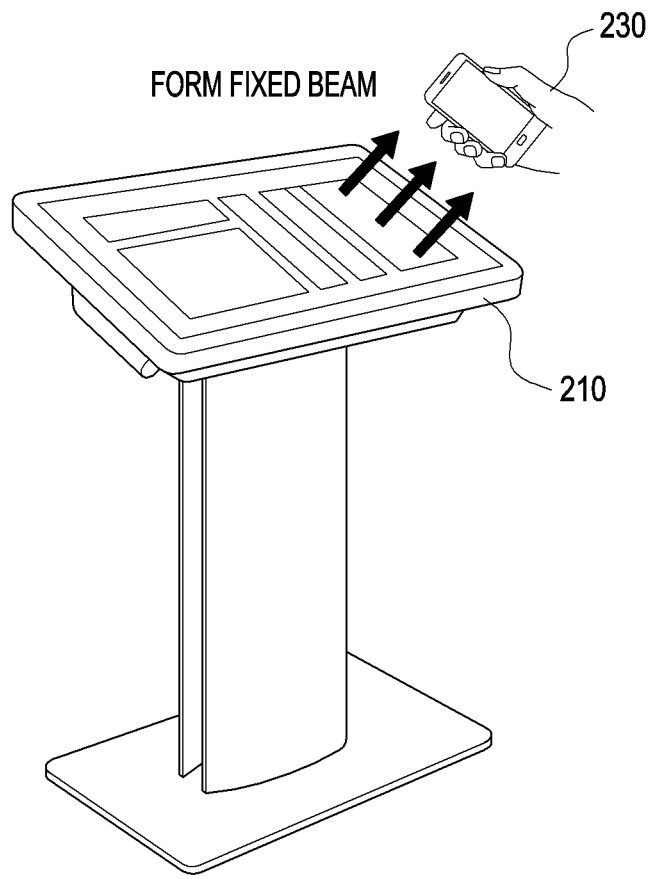
FIG. 16 is a diagram for describing an operation to control a data communication of an electronic device.

FIG. 15 is a flowchart illustrating an operation to control a data communication of an electronic device 210 according to various embodiments, and FIG. 16 is a diagram for describing an operation to control a data communication of an electronic device 210.

In operation 1510, the electronic device 210 (e.g., a processor 211) may establish a first communication channel 201 with a first external electronic device 230 using a communication module 213.

Referring to FIG. 16, if a user who uses the first external electronic device 230 wants to upload a large amount of data in a short time, or to back up the large amount of data to a second external electronic device 250 which is a cloud server of the user of the first external electronic device 230, the first external electronic device 230 may be located within a designated direction and/or a designated distance of the electronic device 210, so the electronic device 210 and the first external electronic device 230 may start connecting a communication channel.

According to an embodiment, if the electronic device 210 uses a communication technology of a 60 GHz frequency band of a 802.11ad standard technology, a beamforming (e.g., beamforming using an antenna array) technology may be applied to the electronic device 210 to overcome weakness of a propagation characteristic of the 60 GHz frequency band of the 802.11ad standard technology. For example, if a communication of the 60 GHz frequency band is connected between the electronic device 210 and the first external electronic device 230, propagation loss may occur seriously according to a propagation path due to a characteristic of the communication of the 60 GHz frequency band, for example, straightness of a radio wave according to use of a high frequency. In order to solve the described communication problem of the 60 GHz frequency band, as shown in FIG. 16, the beamforming technology may be applied to the electronic device 210 to increase data transmission and reception efficiency. Referring to FIG. 16, the electronic device 210 may form a fixed beam and transmit the fixed beam to the first external electronic device 230. If a beam is formed between the electronic device 210 and the first external electronic device 230, association between the electronic device 210 and the first external electronic device 230 may be automatically performed. For example, if the first external electronic device 230 is located within a designated direction and/or a designated distance of the electronic device 210, a designated beam factor may be set between the first external electronic device 230 and the electronic device 210 according to the fixed beam formed by the electronic device 210, so a communication channel of the 60 GHz frequency band may be automatically established between the electronic device 210 and the first external electronic device 230.

According to an embodiment, when the communication channel of the 60 GHz frequency band between the electronic device 210 and the first external electronic device 230 is established, the electronic device 210 may perform an authentication operation within a set domain. For example, a user who subscribes to a service provided by the electronic device 210 may use a plurality of electronic devices, so the electronic device 210 may provide 1:N authentication between the user and the electronic devices. For example, if one user has a plurality of external electronic devices (e.g., a first external electronic device), the electronic device 210 may differentiate a service provided to each of the plurality of external electronic devices. For example, the electronic device 210 may perform an authentication operation using extensible authentication protocol-authentication and key agreement (EAP-AKA) information (SIM information), MAC information, etc. which use a unique ID of the first external electronic device 230.

For example, when the communication of the 60 GHz frequency band between the electronic device 210 and the first external electronic device 230 is connected, authentication of the first external electronic device 230 may be performed through unique information of the first external electronic device 230. For example, unique authentication of the first external electronic device 230 may be performed through extensible authentication protocol-authentication and key agreement (EAP-AKA) authentication (SIM authentication) which uses SIM information included in the first external electronic device 230. For example, when the authentication of the first external electronic device 230 is completed, the first external electronic device 230 may identify a home directory of a user of the first external electronic device 230 which is assigned to the electronic device 210.

In operation 1520, the electronic device 210 may perform an operation of uploading data to the first external electronic device 230 or downloading data from the first external electronic device 230.

According to an embodiment, the first external electronic device 230 may download required data from the electronic device 210, or upload required data to the electronic device 210 using the first communication channel 201.

For example, when the first external electronic device 230 uploads a large amount of data to the electronic device 210 using the communication of the 60 GHz frequency band, the electronic device 210 may identify a storage device of a user of the first external electronic device 230. For example, the electronic device 210 may designate a specific physical memory address of the storage device as a secure storage area so that the user's data is not exposed to other users, and store the user's data. As another example, when downloading data from the electronic device 210 using the communication of the 60 GHz frequency band, the first external electronic device 230 may identify a user's ID and a physical memory address of a stored file to perform download of the data.

In operation 1530, the electronic device 210 may determine whether to upload data stored in the electronic device 210 to the second external electronic device 250.

According to an embodiment, the electronic device 210 may determine whether to upload the data stored in the electronic device 210 to the second external electronic device 250 based on information included in the stored data, information received from the first external electronic device 230, and/or information input from a user, etc.

In operation 1530, if the electronic device 210 determines to upload the data stored in the electronic device 210 to the second external electronic device 250, operation 1540 may be performed. Otherwise, an operation of the present embodiment may be terminated.

In operation 1540, the electronic device 210 may upload the data to the second external electronic device 250. For example, the electronic device 210 may upload the data to the second external electronic device 250 using the second communication channel 203.

According to an embodiment, the electronic device 210 may identify information of the second external electronic device 250 (e.g., an ID and/or a password of the second external electronic device 250) received through the input device of the electronic device 210, the electronic device 210 may identify information related to authentication of the first external electronic device 230 (information of the first external electronic device 230) received from the first external electronic device 230, the electronic device 210 may identify information of the second external electronic device 250 received during an authentication operation between the electronic device 210 and the first external electronic device 230, or the electronic device 210 may identify information of the second external electronic device 250 stored in the electronic device 210. The electronic device 210 may upload the stored data to the second external electronic device 250 using the identified information of the second external electronic device 250. For example, the electronic device 210 may upload data to the second external electronic device 250 using the second communication channel 203. For example, when the upload of data is completed, the electronic device 210 may transmit an upload completion notification to the first external electronic device 230.

Figure 17:
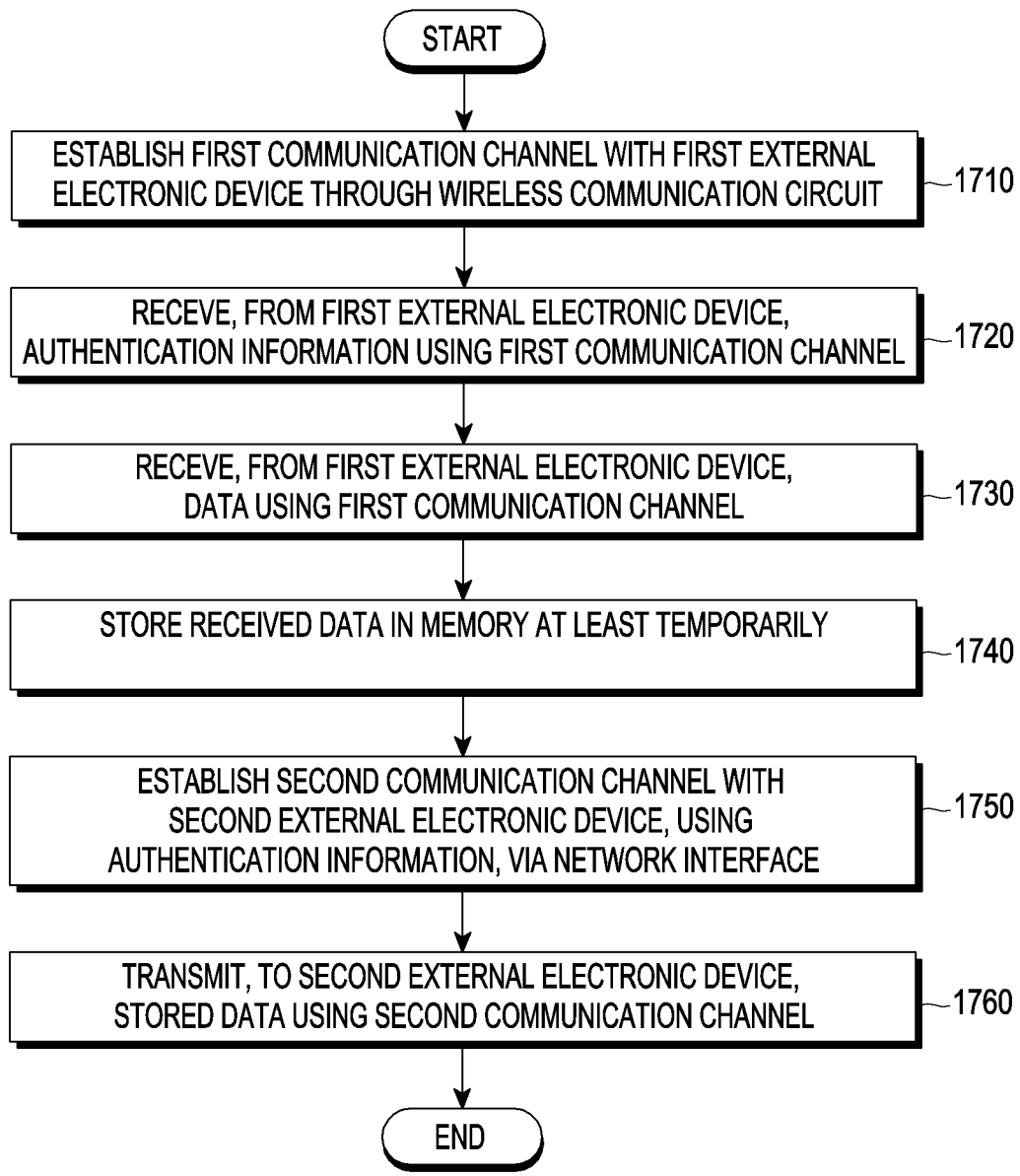
FIG. 17 is a flowchart illustrating an operation to control a data communication of an electronic device according to various embodiments.

FIG. 17 is a flowchart illustrating an operation to control a data communication of an electronic device 210 according to various embodiments.

Referring to FIG. 17, the electronic device 210 (e.g., a processor 211) may perform an operation of receiving data from a first external electronic device 230 through a first communication using a first communication channel 201, and transmitting the data to a second external electronic device 250 through a second communication using a second communication channel, and at least part of an operation of the electronic device 210 may be simultaneously performed. For example, the electronic device 210 may transmit (upload) data to the second external electronic device 250 after storage (backup) of received data in a memory is completed. As another example, while storing (backing up) the received data in the memory, the electronic device 210 may transmit (upload) data to the second external electronic device 250 after predetermined time elapses.

In operation 1710, the electronic device 210 may establish a first communication channel 201 with the first external electronic device 230 using a wireless communication circuit (e.g., a communication module 190 or a communication module 213).

According to an embodiment, the wireless communication circuit may be a circuit configured to communicate with an external device using a frequency between 10 GHz and 100 GHz. For example, the communication circuit can be configured to support a WiGig communication specification.

In operation 1720, the electronic device 210 may receive authentication information from the first external electronic device 230 using the first communication channel 201.

According to an embodiment, the authentication information (also referred to as information related to authentication) may include at least part of a type of the first external electronic device 230 connected to the electronic device 210, device information (e.g., MAC address information, etc.) of the first external electronic device 230, communication provider information of the first external electronic device 230, account information of the first external electronic device 230, service information being used by the first external electronic device 230, service information for data backup of the first external electronic device 230 (e.g., cloud server information (e.g., URL of a cloud server, an ID, a password, etc.) being used by a user of the first external electronic device 230), and/or information of the second external electronic device 250 to which the data of the first external electronic device 230 will be backed up.

In operation 1730, the electronic device 210 may receive data from the first external electronic device 230 using the first communication channel 201.

According to an embodiment, the electronic device 210 may receive data from the first external electronic device 230 using the first communication channel 201 while or after receiving the authentication information.

In operation 1740, the electronic device 210 may store the received data.

According to an embodiment, the electronic device 210 may store the received data in the memory 217 at least temporarily.

In operation 1750, the electronic device 210 may establish a second communication channel 203 with the second external electronic device 250 using a network interface (e.g., the communication module 213) which is wiredly or wirelessly connectable and the authentication information.

According to an embodiment, the second external electronic device 250 may be a server related to a user account of the first external electronic device 230.

In operation 1760, the electronic device 210 may transmit, to the second external electronic device 250, the stored data using the second communication channel 203.

According to an embodiment, the second external electronic device 250 may store the data received from the electronic device 210.

Figure 18:
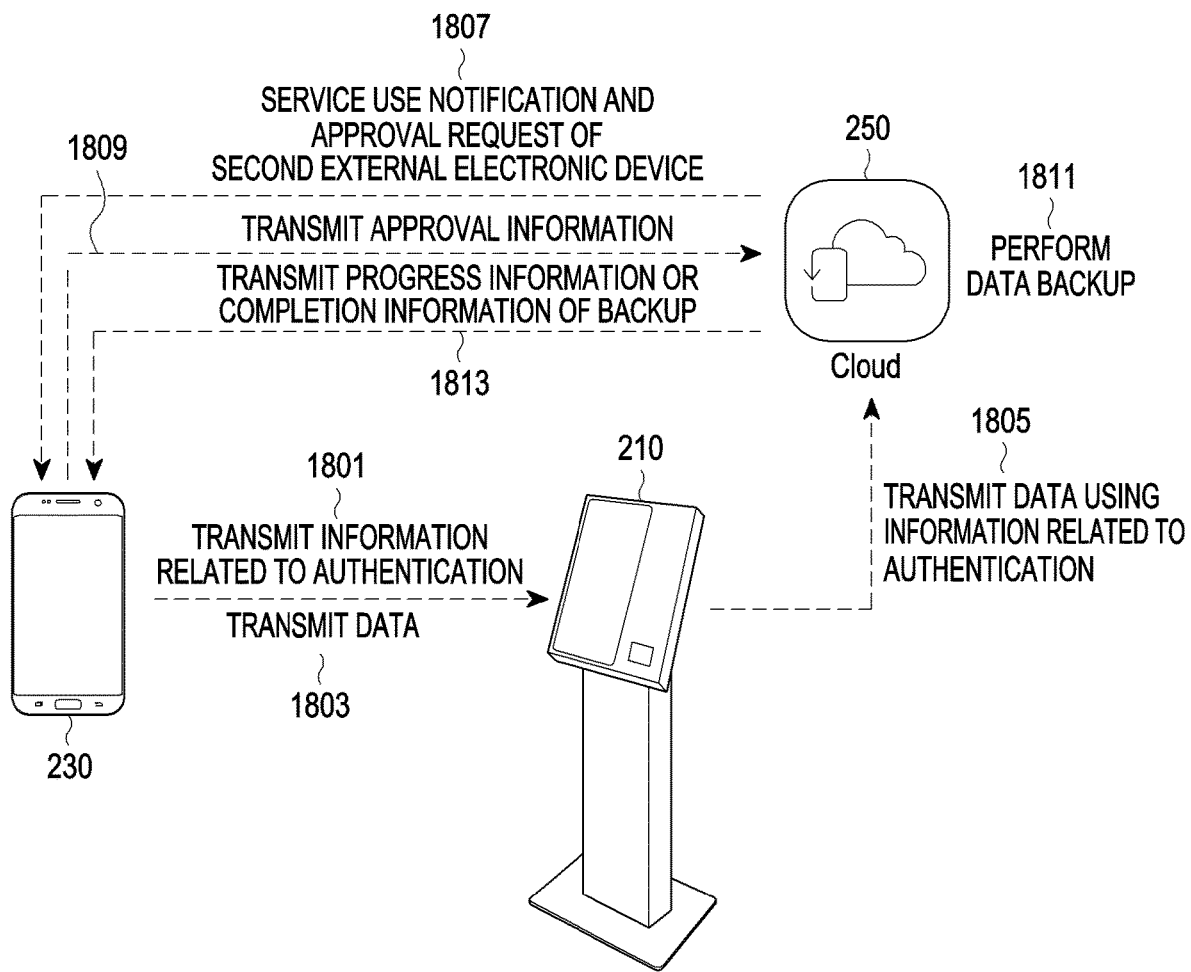
FIG. 18 is a diagram for describing a data backup operation of a first external electronic device according to various embodiments.

FIG. 18 is a diagram for describing a data backup operation of a first external electronic device 230 according to various embodiments.

In operation 1801, the first external electronic device 230 may transmit information related to authentication to an electronic device 210.

According to an embodiment, the first external electronic device 230 may transmit, to the electronic device 210, information related to authentication of the first external electronic device 230 using a first communication channel 201 between the first external electronic device 230 and the electronic device 210. For example, the first communication channel 201 may be a communication channel of a communication of a 60 GHz frequency band.

According to an embodiment, the information related to authentication of the first external electronic device 230 may include at least part of a type of the first external electronic device 230, device information (e.g., MAC address information, etc.) of the first external electronic device 230, communication provider information of the first external electronic device 230, account information of the first external electronic device 230, service information being used by the first external electronic device 230, service information for data backup of the first external electronic device 230 (e.g., cloud server information (e.g., URL of a cloud server, an ID, a password, etc.) being used by a user of the first external electronic device 230), and/or information of a second external electronic device 250 to which the data of the first external electronic device 230 will be backed up, etc.

In operation 1803, the first external electronic device 230 may transmit data to the electronic device 210.

According to an embodiment, the first external electronic device 230 may transmit data to the electronic device 210 using the first communication channel 201 between the first external electronic device 230 and the electronic device 210. For example, the first communication channel 201 may be a communication channel of a 60 GHz frequency band.

In operation 1805, the electronic device 210 may transmit, to the second external electronic device 250, at least part of data received from the first external electronic device 230 using information related to authentication received from the first external electronic device 230.

According to an embodiment, the electronic device 210 may identify information of the second external electronic device 250 to which data will be transmitted, and the data is received based on the information related to authentication received from the first external electronic device 230 will be transmitted.

According to an embodiment, the electronic device 210 may transmit, to the second external electronic device 250, at least part of the data received from the first external electronic device 230 based on the identified information of the second external electronic device 250 using the second communication channel 203 between the electronic device 210 and the second external electronic device 250. For example, the second communication channel 203 may be a communication channel of 2.4 to 5 GHz frequency band. As another example, the second communication channel 203 may be an Ethernet communication channel.

In operation 1807, the second external electronic device 250 may transmit, to the first external electronic device 230, service use notification and approval request of the second external electronic device 250 based on reception of the data from the electronic device 210.

According to an embodiment, the second external electronic device 250 may transmit, to the first external electronic device 230, the service use notification and the approval request of the second external electronic device 250 using the third communication channel between the second external electronic device 250 and the first external electronic device 230.

According to an embodiment, when the electronic device 210 transmits, to the second external electronic device 250, the data received from the first external electronic device 230 (when transmitting a signal for transmitting, to the second external electronic device 250, the data received from the first external electronic device 230), the second external electronic device 250 may transmit, to the first external electronic device 230, use notification of a cloud service (use notification of a backup service) of the second external electronic device 250 and an approval request for backing up the data to the cloud service in order to determine whether to back up the received data.

In operation 1809, the first external electronic device 230 may transmit, to the second external electronic device 250, the service use notification received from the second external electronic device 250 and approval information for the approval request.

According to an embodiment, the first external electronic device 230 may transmit the approval information to the second external electronic device 250 using the third communication channel between the first external electronic device 230 and the second external electronic device 250.

According to an embodiment, when the use notification of the cloud service (the use notification of the backup service) of the second external electronic device 250 and the approval request for backing up the data to the cloud service are received from the second external electronic device 250, the first external electronic device 230 may display notification which corresponds to the use notification of the cloud service (the use notification of the backup service) of the second external electronic device 250 and the approval request for backing up the data to the cloud service on a display 237 of the first external electronic device 230. The first external electronic device 230 may transmit, to the second external electronic device 250, approval information for the backup of the data to the cloud service based on a user input for the displayed information.

In operation 1811, the second external electronic device 250 may perform backup of the data received from the electronic device 210 based on the approval information received from the first external electronic device 230.

In operation 1813, the second external electronic device 250 may transmit progress information or completion information of the backup to the first external electronic device 230.

According to an embodiment, the second external electronic device 250 may transmit, to the first external electronic device 230, the progress information or completion information of the backup using the third communication channel between the second external electronic device 250 and the first external electronic device 230. For example, the progress information of the backup may be automatically transmitted from the second external electronic device 250 to the first external electronic device 230 based on at least one designated progress time and/or at least one designated progress level.

Figure 19:
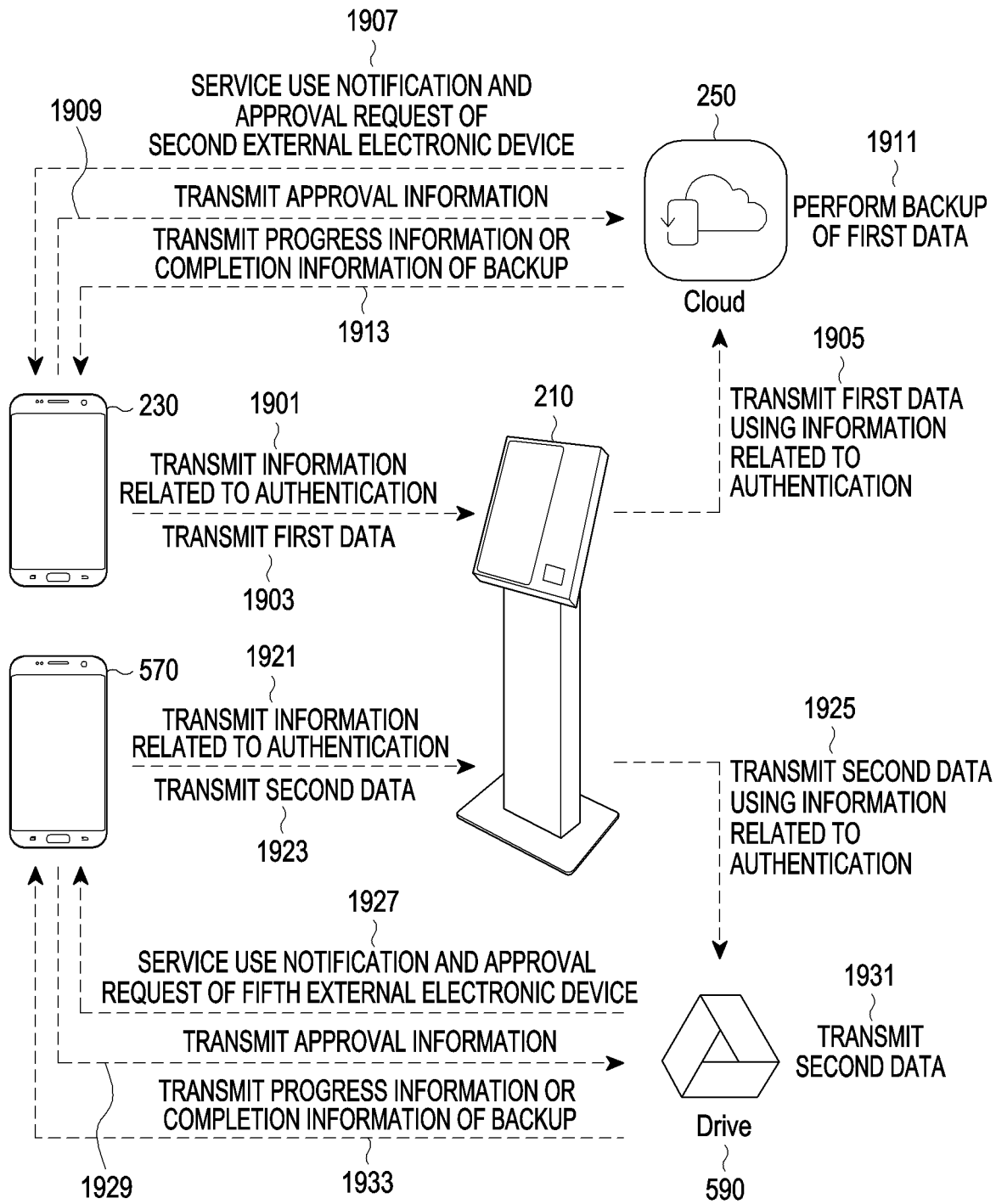
FIG. 19 is a diagram for describing a data backup operation of a first external electronic device and a fourth external electronic device according to various embodiments.

FIG. 19 is a diagram for describing a data backup operation of a first external electronic device 230 and a fourth external electronic device 570 according to various embodiments.

In operation 1901, the first external electronic device 230 may generate a first communication channel 201 with an electronic device 210, and transmit information related to authentication to the electronic device 210 using the first communication channel 201.

According to an embodiment, the first external electronic device 230 may transmit, to the electronic device 210, information related to authentication of the first external electronic device 230 using the first communication channel 201 between the first external electronic device 230 and the electronic device 210. For example, the first communication channel 201 may be a communication channel of a communication of a 60 GHz frequency band.

According to an embodiment, the information related to authentication of the first external electronic device 230 may include at least part of a type of the first external electronic device 230, device information (e.g., MAC address information, and/or the like) of the first external electronic device 230, communication provider information of the first external electronic device 230, account information of the first external electronic device 230, service information being used by the first external electronic device 230, service information for data backup of the first external electronic device 230 (e.g., cloud server information (e.g., URL of a cloud server, an ID, a password, an/or the like) being used by a user of the first external electronic device 230), information of a second external electronic device 250 to which the data of the first external electronic device 230 will be backed up, and/or the like.

In operation 1903, the first external electronic device 230 may transmit first data to the electronic device 210.

According to one embodiment, the first external electronic device 230 may transmit the first data to the electronic device 210 using the first communication channel 201 between the first external electronic device 230 and the electronic device 210.

In operation 1905, the electronic device 210 may transmit the first data received from the first external electronic device 230 to the second external electronic device 250 using the information related to authentication received from the first external electronic device 230.

According to an embodiment, the electronic device 210 may identify information of the second external electronic device 250 to which the first data received from the first external electronic device 230 will be transmitted, and the information of the second external electronic device 250 is included in the information related to authentication received from the first external electronic device 230.

According to an embodiment, the electronic device 210 may transmit, to the second external electronic device 250, the first data received from the first external electronic device 230 based on the identified information of the second external electronic device 250 using the second communication channel 203 between the electronic device 210 and the second external electronic device 250. For example, the second communication channel 203 may be a communication channel of 2.4 to 5 GHz frequency band.

In operation 1907, the second external electronic device 250 may transmit, to the first external electronic device 230, service use notification and approval request of the second external electronic device 250 based on the reception of the first data from the electronic device 210.

According to an embodiment, the second external electronic device 250 may transmit, to the first external electronic device 230, the service use notification and the approval request of the second external electronic device 250 using the third communication channel between the second external electronic device 250 and the electronic device 210.

According to an embodiment, when the electronic device 210 transmits, to the second external electronic device 250, the first data received from the first external electronic device 230 (when transmitting a signal for transmitting, to the second external electronic device 250, the first data received from the first external electronic device 230), the second external electronic device 250 may transmit, to the first external electronic device 230, use notification of a cloud service (use notification of a backup service) of the second external electronic device 250 and an approval request for backing up the first data to the cloud service in order to determine whether to back up the received first data.

In operation 1909, the first external electronic device 230 may transmit, to the external electronic device 250, the service use notification received from the external electronic device 250 and approval information for the approval request.

According to an embodiment, the second external electronic device 250 may transmit the approval information to the second external electronic device 250 using the third communication channel between the second external electronic device 250 and the electronic device 210.

According to an embodiment, when the use notification of the cloud service (the use notification of the backup service) of the second external electronic device 250 and the approval request for backing up the first data to the cloud service are received from the second external electronic device 250, notification which corresponds to the use notification of the cloud service (the use notification of the backup service) of the second external electronic device 250 and the approval request for backing up the first data to the cloud service may be displayed on a display device of the first external electronic device 230. The first external electronic device 230 may transmit, to the second external electronic device 250, approval information for the backup of the first data to the cloud service based on a user input for the displayed information.

In operation 1911, the second external electronic device 250 may perform backup of the first data received from the electronic device 210 based on the approval information received from the first external electronic device 230.

According to an embodiment, when the approval information is received from the first external electronic device 230, the backup of the received first data may be performed.

In operation 1913, the second external electronic device 250 may transmit, to the first external electronic device 230, progress information or completion information of the backup.

According to an embodiment, the second external electronic device 250 may transmit, to the first external electronic device 230, the progress information or completion information of the backup using the third communication channel between the second external electronic device 250 and the electronic device 210. For example, the progress information of the backup may be automatically transmitted from the second external electronic device 250 to the first external electronic device 230 based on at least one designated progress time and/or at least one designated progress level.

In operation 1921, a fourth electronic device 570 may generate a fourth communication channel with the electronic device 210, and transmit information related to authentication to the electronic device 210 using the fourth communication channel.

According to an embodiment, the fourth electronic device 570 may transmit, to the electronic device 210, information related to authentication of the fourth electronic device 570 using the fourth communication channel between the fourth electronic device 570 and the electronic device 210. For example, the fourth communication channel may be a communication channel of a communication of a 60 GHz frequency band.

According to an embodiment, the information related to authentication of the fourth electronic device 570 may include at least part of a type of the fourth electronic device 570, device information (e.g., MAC address information, etc.) of the fourth electronic device 570, communication provider information of the fourth electronic device 570, account information of the fourth electronic device 570, service information being used by the fourth electronic device 570, service information for data backup of the fourth electronic device 570 (e.g., cloud server information (e.g., URL of a cloud server, an ID, a password, etc.) being used by a user of the fourth electronic device 570), and/or information of a fifth electronic device 590 to which the data of the fourth electronic device 570 will be backed up, etc.

In operation 1923, the fourth electronic device 570 may transmit the second data to the electronic device 210.

According to an embodiment, the fourth electronic device 570 may transmit the second data to the electronic device 210 using the fourth communication channel between the fourth electronic device 570 and the electronic device 210.

In operation 1925, the electronic device 210 may transmit, to the fifth electronic device 590, the second data received from the fourth electronic device 570 using information related to authentication received from the fourth electronic device 570.

According to an embodiment, the electronic device 210 may identify information of the fifth electronic device 590 to which the second data received from the fourth electronic device 570 will be transmitted, and the information of the fifth electronic device 590 is included in the information related to authentication received from the fourth electronic device 570.

According to an embodiment, the electronic device 210 may transmit, to the fifth electronic device 590, the second data received from the fourth electronic device 570 based on the identified information of the fifth electronic device 590 using the fifth channel between the electronic device 210 and the fifth electronic device 590. For example, the fifth communication channel may be a communication channel of a 2.4 to 5 GHz frequency band. For another example, the fifth communication channel may be an Ethernet communication channel.

In operation 1927, the fifth electronic device 590 may transmit, to the fourth electronic device 570, service use notification and approval request of the fifth electronic device 590 based on the reception of the second data from the electronic device 210.

According to an embodiment, the fifth electronic device 590 may transmit, to the fourth electronic device 570, the service use notification and the approval request of the fifth electronic device 590 using a sixth communication channel between the fifth electronic device 590 and the fourth electronic device 570.

According to an embodiment, when the electronic device 210 transmits, to the fifth electronic device 590, the second data received from the fourth electronic device 570 (when transmitting a signal for transmitting, to the fifth electronic device 590, the second data received from the fourth electronic device 570), the fifth electronic device 590 may transmit, to the fourth electronic device 570, use notification of a cloud service (use notification of a backup service) of the fifth electronic device 590 and an approval request for backing up the second data to the cloud service in order to determine whether to back up the received second data.

In operation 1929, the fourth electronic device 570 may transmit, to the fifth electronic device 590, the service use notification received from the fifth electronic device 590 and approval information for the approval request.

According to an embodiment, the fourth electronic device 570 may transmit the approval information to the fifth electronic device 590 using the sixth communication channel between the fifth electronic device 590 and the fourth electronic device 570.

According to an embodiment, when the use notification of the cloud service (the use notification of the backup service) of the fifth electronic device 590 and the approval request for backing up the second data to the cloud service are received from the fifth electronic device 590, notification which corresponds to the use notification of the cloud service (the use notification of the backup service) of the fifth electronic device 590 and the approval request for backing up the second data to the cloud service may be displayed on a display device of the fourth electronic device 570. The fourth electronic device 570 may transmit, to the fifth electronic device 590, approval information for the backup of the second data to the cloud service based on a user input for the displayed information.

In operation 1931, the fifth electronic device 590 may perform backup of the second data received from the electronic device 210 based on the approval information received from the fourth electronic device 570.

According to an embodiment, when the approval information is received from the fourth electronic device 570, the backup of the received second data may be performed.

In operation 1933, the fifth electronic device 590 may transmit, to the fourth electronic device 570, progress information or completion information of the backup.

According to an embodiment, the fifth electronic device 590 may transmit, to the fourth electronic device 570, the progress information or completion information of the backup using a sixth communication channel between the fifth electronic device 590 and the fourth electronic device 570. For example, the progress information of the backup may be automatically transmitted from the fifth electronic device 590 to the fourth electronic device 570 based on at least one designated progress time and/or at least one designated progress level.

According to various embodiments, a method to control a data communication of an electronic device (e.g., an electronic device 210) is provided, and the method may comprise establishing a first communication channel (e.g., a first communication channel 201) with a first external device (e.g., a first external electronic device 230) using a wireless communication circuit (e.g., a communication module 213) which is configured to communicate with an external device using a frequency between 10 GHz and 100 GHz, receiving authentication information from the first external device using the first communication channel, receiving data from the first external device using the first communication channel while or after receiving the authentication information, storing the received data at least temporarily in a memory (e.g., a memory 217) of the electronic device, establishing a second communication channel (e.g., a second communication channel 203) with a second external device (e.g., a second external electronic device 250) using the authentication information via a network interface (e.g., the communication module 213) of the electronic device, and transmitting the stored data to the second external device using the second communication channel.

According to various embodiments, the first external device may be a mobile device related to a user account, and the second external device may be a server related to the user account.

According to various embodiments, the method may further comprise deleting the stored data after the transmission of the data.

According to various embodiments, the frequency may be 60 GHz.

According to various embodiments, the wireless communication circuit may be configured to support a WiGig specification.

According to various embodiments, the data may include backup data stored in the electronic device.

According to various embodiments, storing the received data at least temporarily in the memory of the electronic device may comprise storing the data at least temporarily in a designated storage area in the memory or a generated storage area in the memory using the authentication information.

According to various embodiments, the method may further comprise encrypting the data if the data is not encrypted data.

According to various embodiments, a machine-readable storage medium having recorded thereon a program to execute a method to control a data communication of an electronic device is provided, and the method may comprise establishing a first communication channel (e.g., a first communication channel 201) with a first external device (e.g., a first external electronic device 230) using a wireless communication circuit (e.g., a communication module 213) which is configured to communicate with an external device using a frequency between 10 GHz and 100 GHz, receiving authentication information from the first external device using the first communication channel, receiving data from the first external device using the first communication channel while or after receiving the authentication information, storing the received data at least temporarily in a memory (e.g., a memory 217) of the electronic device, establishing a second communication channel (e.g., a second communication channel 203) with a second external device (e.g., a second external electronic device 250) using the authentication information via a network interface (e.g., the communication module 213) of the electronic device, and transmitting the stored data to the second external device using the second communication channel.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a network interface wired or wireless communication;
   a wireless communication circuit configured to communicate with an external device;
   a processor operatively connected with the network interface and the wireless communication circuit; and
   a memory which is located in a housing structure, and operatively connected with the processor, wherein the memory stores instructions that cause, when executed, the processor to:
   in response to a first external device being positioned within a predetermined distance from the electronic device in a predetermined direction, establish a first communication channel with the first external device using the wireless communication circuit;
   receive authentication information from the first external device using the first communication channel;
   receive data from the first external device using the first communication channel while or after receiving the authentication information;
   in response to the receiving of the data, terminate the first communication channel;
   store the received data in the memory at least temporarily;

identify a second external device from among a plurality of external devices, based on service information for data backup included in the authentication information;

establish a second communication channel with the identified second external device via the network interface; and transmit the stored data to the identified second external device using the second communication channel.

2. The electronic device of claim 1, wherein the first external device is a mobile device related to a user account, and the identified second external device is a server related to the user account.

3. The electronic device of claim 1, wherein the instructions cause the processor to delete the stored data after transmission of the data.

4. The electronic device of claim 1, wherein the electronic device is a kiosk.

5. The electronic device of claim 4, wherein the electronic device further comprises a touch screen display.

6. The electronic device of claim 1, wherein the wireless communication circuit is configured to communicate with the external device using a frequency between 10 GHz and 100 GHz.

7. The electronic device of claim 6, wherein the wireless communication circuit is configured to support a WiGig specification.

8. The electronic device of claim 1, wherein the instructions cause the processor to store the data at least temporarily in a designated storage area of the memory or a storage area generated in the memory using the authentication information.

9. The electronic device of claim 1, wherein the instructions cause the processor to encrypt the data in case that the data is not encrypted data.

10. The electronic device of claim 1, wherein the instructions cause the processor to establish the first communication channel with the first external device using the wireless communication circuit based on a previous connection record with the first external device which is stored in the memory.

11. A method to control a data communication of an electronic device, comprising:

in response to a first external device being positioned within a predetermined distance from the electronic device in a predetermined direction, establishing a first communication channel with the first external device using a wireless communication circuit;

receiving authentication information from the first external device using the first communication channel;

receiving data from the first external device using the first communication channel while or after receiving the authentication information;

in response to the receiving of the data, terminating the first communication channel;

storing the received data at least temporarily in a memory of the electronic device;

identifying a second external device from among a plurality of external devices, based on service information for data backup included in the authentication information;

establishing a second communication channel with the identified second external device, using the authentication information, via a network interface of the electronic device; and transmitting the stored data to the identified second external device using the second communication channel.

12. The method of claim 11, wherein the first external device is a mobile device related to a user account, and the identified second external device is a server related to the user account.

13. The method of claim 11, wherein the wireless communication circuit is configured to communicate with the external device using a frequency between 10 GHz and 100 GHz.

14. A machine-readable storage medium having recorded thereon a program to execute a method to control a data communication of an electronic device, wherein the method comprises:

in response to a first external device being positioned within a predetermined distance from the electronic device in a predetermined direction, establishing a first communication channel with a first external device using a wireless communication circuit;

receiving authentication information from the first external device using the first communication channel;

receiving data from the first external device using the first communication channel while or after receiving the authentication information;

in response to the receiving of the data, terminating the first communication channel;

storing the received data at least temporarily in a memory of the electronic device;

identifying a second external device from among a plurality of external devices, based on service information for data backup included in the authentication information;

establishing a second communication channel with the identified second external device, using the authentication information, via a network interface of the electronic device; and transmitting the stored data to the identified second external device using the second communication channel.

* * * * *